US008757957B2

(12) United States Patent
Pitzer et al.

(10) Patent No.: US 8,757,957 B2
(45) Date of Patent: Jun. 24, 2014

(54) APPARATUS FOR BOX LABELING ON A PALLET, METHOD OF PROVIDING THE SAME, AND METHOD OF MARKING BOXES

(75) Inventors: Robert H. Pitzer, Plant City, FL (US); Michael J. Linnen, Waxhaw, NC (US)

(73) Assignee: Firetag, LLC, Plant City, FL (US)

(*) Notice: Subject to any disclaimer, the term of this patent is extended or adjusted under 35 U.S.C. 154(b) by 317 days.

(21) Appl. No.: 12/983,146

(22) Filed: Dec. 31, 2010

(65) Prior Publication Data

US 2011/0252986 A1 Oct. 20, 2011

Related U.S. Application Data

(60) Provisional application No. 61/325,774, filed on Apr. 19, 2010.

(51) Int. Cl.
*B41J 2/435* (2006.01)
*B41J 2/47* (2006.01)
*B41J 2/01* (2006.01)
*B65G 1/18* (2006.01)

(52) U.S. Cl.
CPC . *B65G 1/18* (2013.01); *B41J 2/435* (2013.01); *B41J 2/47* (2013.01)
USPC ............ 414/799; 347/225; 347/264; 347/110

(58) Field of Classification Search
CPC ................ B41J 2/435; B41J 2/47; B65G 1/18
USPC .................... 347/110, 224, 225, 264; 414/799
See application file for complete search history.

(56) References Cited

U.S. PATENT DOCUMENTS

| 4,624,616 A * | 11/1986 | Freese ........................ 414/797.7 |
| 5,501,571 A | 3/1996 | Van Durrett et al. |
| 2002/0082802 A1* | 6/2002 | Stringer et al. ............... 702/159 |
| 2003/0124221 A1 | 7/2003 | Garwood |
| 2005/0155500 A1* | 7/2005 | Latos et al. .................... 101/126 |
| 2006/0075329 A1 | 4/2006 | Sullivan et al. |

(Continued)

FOREIGN PATENT DOCUMENTS

GB 2288171 10/1995

OTHER PUBLICATIONS

International Search Report for PCT/US2010/062639, 15 pages. Mar. 11, 2011.

*Primary Examiner* — Alessandro Amari
*Assistant Examiner* — Kendrick Liu
(74) *Attorney, Agent, or Firm* — Bryan Cave LLP

(57) ABSTRACT

Some embodiments concern an apparatus configured to label one or more boxes supported by a pallet. In various examples, the pallet can have a pallet label. The apparatus can include: (a) a reading mechanism configured to read first information from the pallet label; (b) a computing system configured to determine one or more markings to apply at one or more predetermined locations to the one or more boxes at least partially based on the first information; (c) a marking mechanism configured to apply the one or more markings to the one or more boxes at the one or more predetermined locations; and (d) a first movement mechanism configured to at least partially position the marking mechanism to apply the one or more markings at the one or more predetermined locations. The marking mechanism is configured to mark each of the one or more boxes without removing the one or more boxes from the pallet. Other embodiments are disclosed.

26 Claims, 13 Drawing Sheets

(56) References Cited

U.S. PATENT DOCUMENTS

| | | |
|---|---|---|
| 2007/0158029 A1 | 7/2007 | Jenkins et al. |
| 2008/0309747 A1* | 12/2008 | McCoin et al. ............... 347/264 |
| 2011/0084127 A1* | 4/2011 | Grant ............................ 235/375 |

* cited by examiner

APPARATUS FOR BOX LABELING ON A PALLET, METHOD OF PROVIDING THE SAME, AND METHOD OF MARKING BOXES

CROSS-REFERENCE TO RELATED APPLICATIONS

This application claims the benefit of U.S. Provisional Application No. 61/325,774, filed Apr. 19, 2010. U.S. Provisional Application No. 61/325,774 is incorporated herein by reference.

TECHNICAL FIELD

This invention relates generally to marking apparatuses, and relates more particularly to apparatuses configured to label one or more boxes located on a pallet, methods of providing the same, and methods of labeling boxes.

BACKGROUND

The individual labeling of boxes is a cumbersome job when the boxes have already been situated on a pallet before labeling. To label the boxes, in this situation, the boxes are typically unstacked from the pallet and sent though a disparate conveyor system specifically designed for labeling the boxes. In other situations, workers will hand-label the boxes on the pallet with a hand-held labeler.

Accordingly, a need or potential for benefit exists for an apparatus or method for labeling boxes located on a pallet without removing the boxes from the pallet.

BRIEF DESCRIPTION OF THE DRAWINGS

The accompanying drawings illustrate the implementation of a box labeling system, according to an embodiment.

Figure 1:
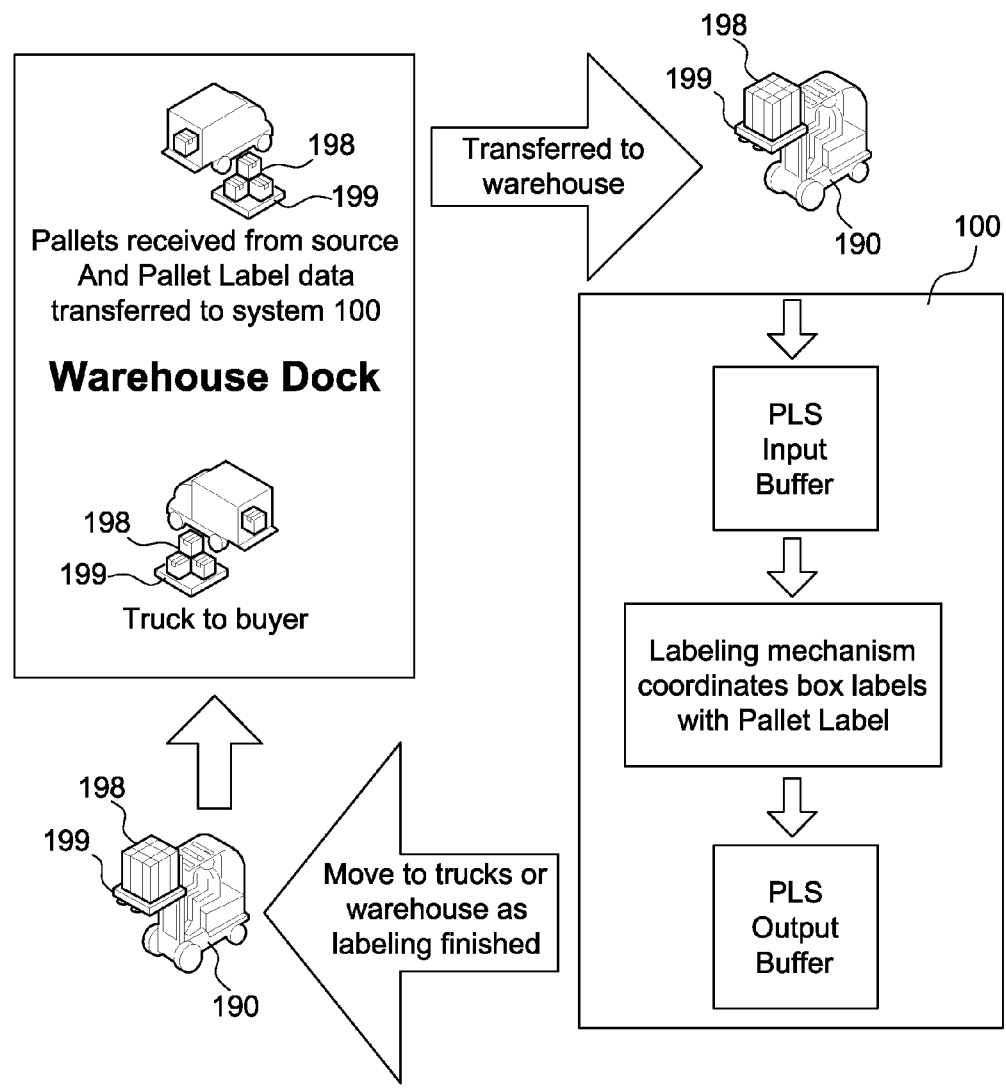
FIG. 1 is a diagram that illustrates an exemplary process flow of labeling boxes located on a pallet, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION OF EXAMPLES OF EMBODIMENTS

Some embodiments concern an apparatus configured to label one or more boxes supported by a pallet. In various examples, the pallet can have a pallet label. The apparatus can include: (a) a reading mechanism configured to read first information from the pallet label; (b) a computing system configured to determine one or more markings to apply at one or more predetermined locations of the one or more boxes at least partially based on the first information; (c) a marking mechanism configured to apply the one or more markings at the one or more predetermined locations of the one or more boxes; and (d) a first movement mechanism configured to at least partially position the marking mechanism to apply the one or more markings at the one or more predetermined locations. The marking mechanism is configured to mark each of the one or more boxes without removing the one or more boxes from the pallet.

Various embodiments concern a box labeling machine for marking a pallet of boxes. The box labeling machine can include: (a) an input buffer configured to hold the pallet of boxes; (b) one or more first sensors configured to determine a first location of the pallet of boxes over the input buffer; (c) a first pallet location adjustment mechanism coupled to the input buffer and configured to move the pallet of boxes from the first location over the input buffer to one or more second locations over the input buffer; (d) a carousel coupled to the input buffer such that the pallet of boxes can be moved from the input buffer to the carousel; (e) one or more second sensors configured to determine a third location of the pallet of boxes over the carousel; (f) a second pallet location adjustment mechanism coupled to the carousel and configured to move the pallet of boxes from the third location over the carousel to one or more fourth locations over the carousel; (g) at least one printer mechanism configured to apply one or more marks to at least one box of the pallet of boxes while the pallet of boxes is located over the carousel; (h) a machine vision mechanism configured to determine a position of the at least one printer mechanism relative to the pallet of boxes; and (i) an output buffer configured to hold the pallet of boxes and coupled to the carousel such that the pallet of boxes can be moved from the carousel to the output buffer.

Yet other embodiments can concern a method of providing a box labeling device configured to label one or more boxes supported by a pallet. The pallet can have a pallet label. The method can include: providing a reading mechanism configured to read first information from at least one of the one or more boxes or the pallet label; providing a computing system configured to determine one or more markings to apply at one or more predetermined locations of the one or more boxes at least partially based on the first information; providing a marking mechanism configured to apply the one or more markings at the one or more predetermined locations of the one or more boxes; and providing a movement mechanism configured to at least partially position the marking mechanism to apply the one or more markings at the one or more predetermined locations.

Still other embodiments can concern a method of label boxes. The method can include: placing a pallet of boxes on an input buffer; moving the pallet of boxes from the input buffer to a box marking region; aligning at least one marking mechanism to the pallet of boxes while the box marking region supports the pallet of boxes; using the at least one marking mechanism to mark each box on the pallet of boxes while the box marking region supports the pallet of boxes; and after using the marking mechanism, moving the pallet of boxes to an output buffer.

Examples of a box marking system can relate generally to an integrated system for the labeling of boxes, handling inventories, order administration, and order fulfillment for distinct and disparate industry products offered by specific customer partners in unified and standalone systems. The box marking system can be part of an integrated system that utilizes the internet when available, but can also work without internet connectivity.

FIG. 1 is a diagram that illustrates an exemplary process flow used by system 100 to label boxes located on a pallet, according to a first embodiment. System 100 provides an integrated system to perform a number of different tasks in several different business models. In a transaction-based system, examples of system 100 can provide customers with a rapid way to mark boxes while charging the customer by the mark. In other examples, system 100 can be part of an integrated system and can provide a mechanism configured to rapidly mark boxes as part of a general processing of the boxes. In certain embodiments, the box marking functionality of system 100 could be combined with other box products and inventory tracking products. In a specific embodiment system 100 is used to mark boxes of produce (e.g, vegetables and/or fruits). System 100 can also be used outside of the produce industry.

Not to be taken in a limiting sense, a simple example of system 100 is shown in FIG. 1. As shown in FIG. 1, at least one pallet 199 with boxes 198 is received at a warehouse and then stored in the warehouse. Pallet 199 can have a pallet tag (not shown). The information from the pallet tag can be read on behalf of system 100 by and/or then stored by system 100. When the information from the pallet tag is read by a different system, the information can be transferred to system 100 by software that is internal to and/or integrated within system 100 and/or by one or more software interfaces that are extend to system 100. The transferred information can include data such as the configuration of the boxes on the pallet, the contents of the boxes, the source of the boxes, tracking codes for the boxes, and/or the marking instructions for the boxes.

Figure 4:
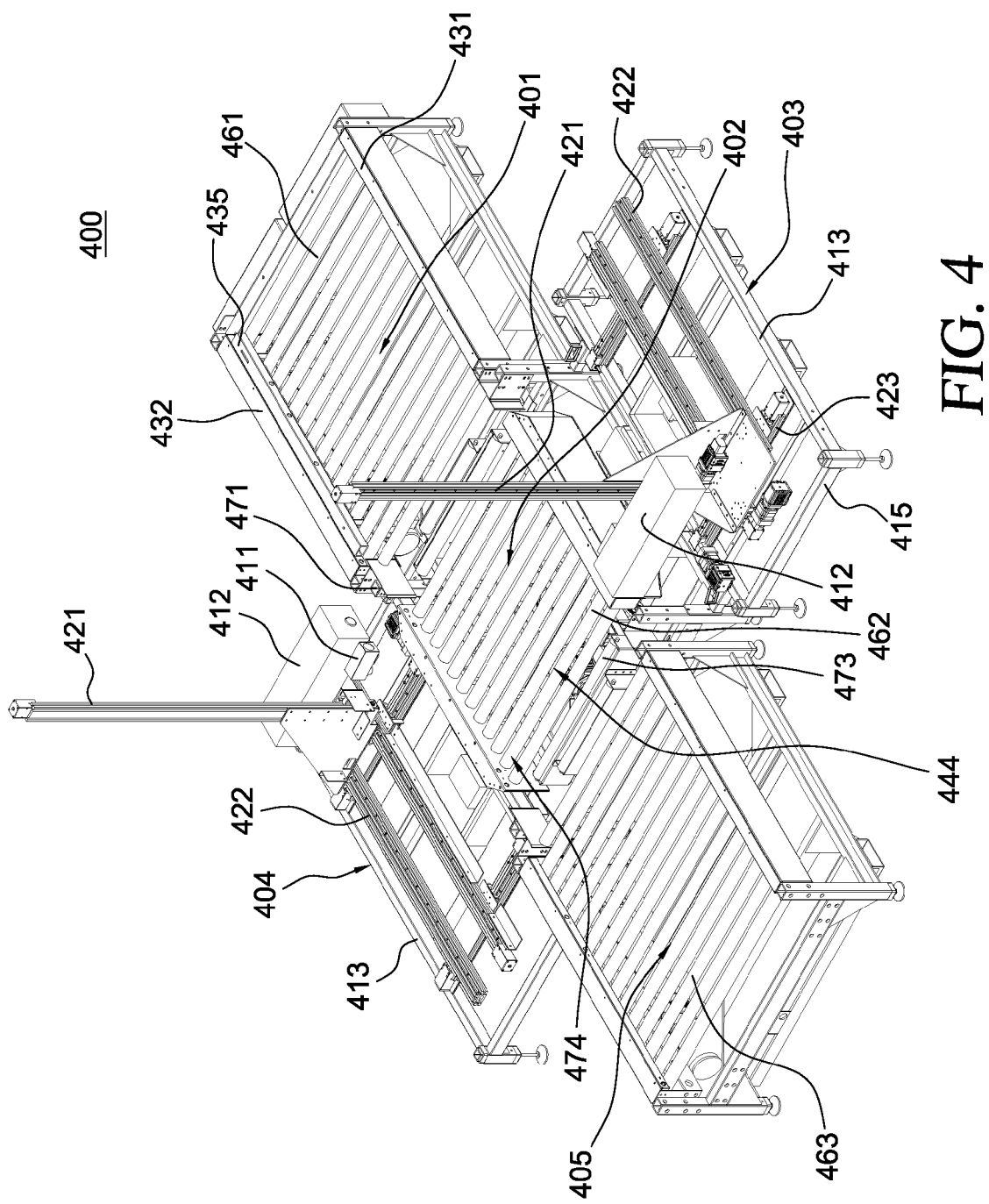
FIG. 4 is a diagram illustrating an example of a pallet labeler machine (PLM) system, according to the first embodiment.

Afterwards, a pallet handling device 190 (e.g., a forklift) can place the pallets (e.g., one-by-one) on an input buffer 401 of a pallet labeling machine (PLM) system 400 (FIG. 4). The pallets (e.g., one-by-one) can then be transferred to a carousel 402 (FIG. 4) where the boxes are labeled. Carousel 402 can be referred to as a box marking region. System 100 can be an automated system that reads the pallet tags when the pallet is introduced into system 100 and then proceeds to mark the boxes on the pallet according to this information. PLM system 400 (FIG. 4) reads marking information off the pallet tag, or information system 100 receives marking information from an external source. PLM system 400 (FIG. 4) can use reading mechanism 411 (FIG. 4) to identify the position of each of the boxes located on the pallet, and also can use a repositionable marking mechanism 412 (FIG. 4) to mark the individual boxes. In some examples, system 100 can label all of the boxes located on pallet 199 without unstacking the boxes located on the pallet, without removing the boxes from the pallet, and even without moving the boxes relative to the pallet. After labeling the boxes, pallet 199 is transferred to an output buffer 405 (FIG. 4) where the same or a different pallet handling device 190 retrieves the pallet of boxes and moves pallet 199 to, for example, a truck or a warehouse.

System 100 can be configured such that marking mechanism 412 (FIG. 4) can mark all boxes with a surface external to the pallet. That is, system 100 can mark any boxes with a side that forms part of an external surface of boxes 198 (i.e., the box is not completely internal (e.g., all sides of the box are adjacent to sides of other boxes) to the stack of boxes 198 on pallet 199).

Figure 2:
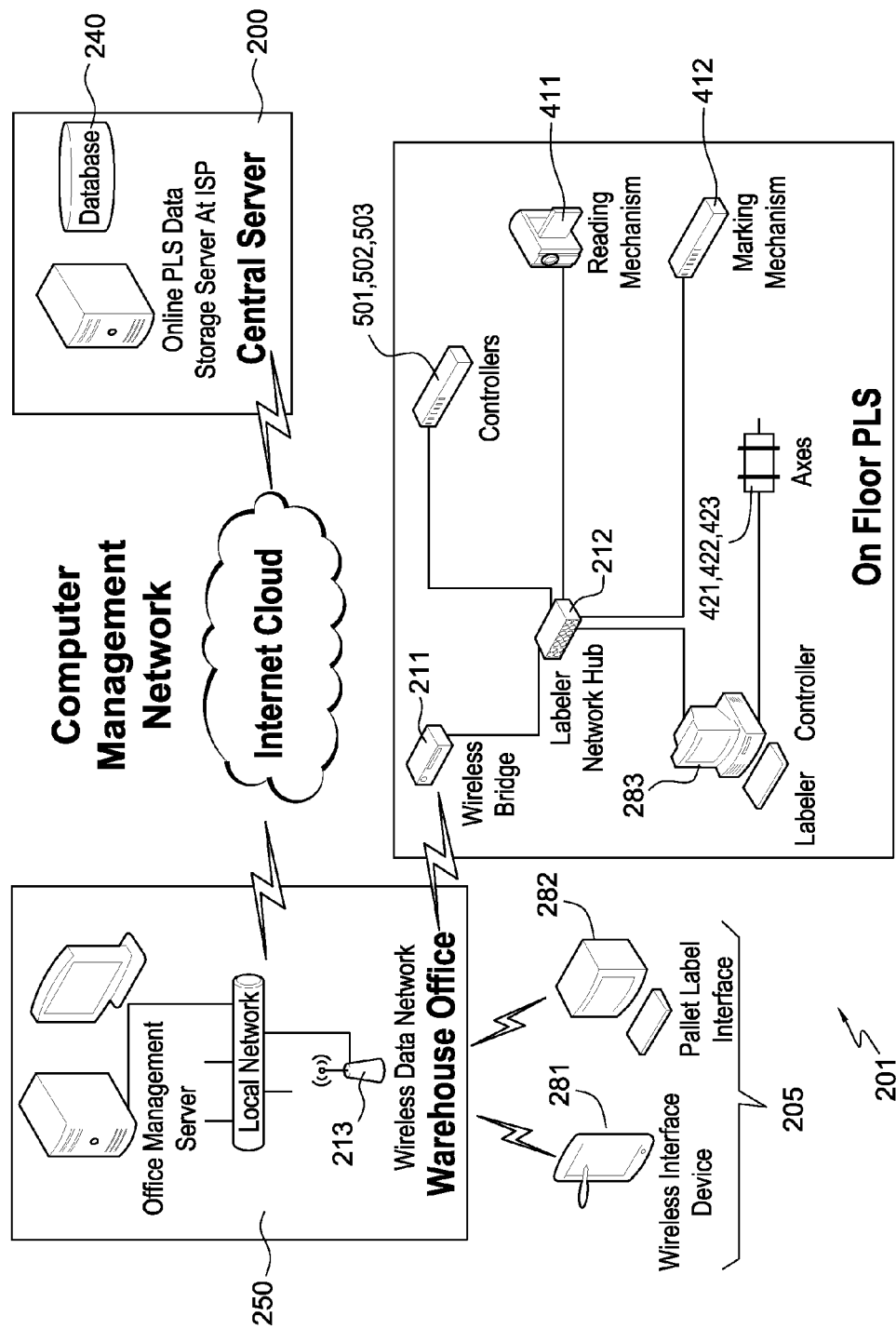
FIG. 2 is an exemplary network architecture diagram of a computer management system for a box labeling system, according to the first embodiment.
Figure 3:
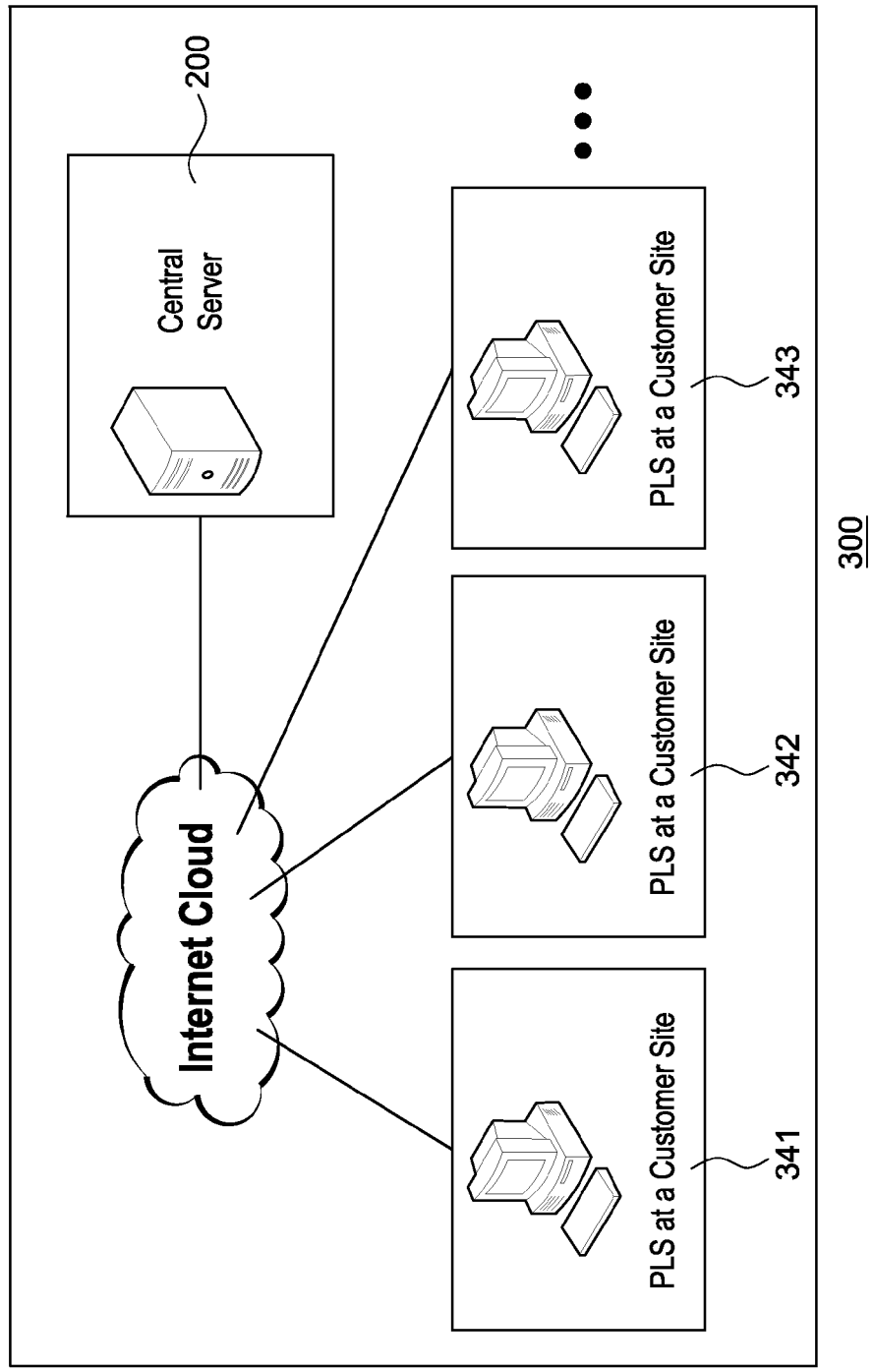
FIG. 3 is a diagram that illustrates an example of the box labeling system of FIG. 2, according to the first embodiment.
Figure 5:
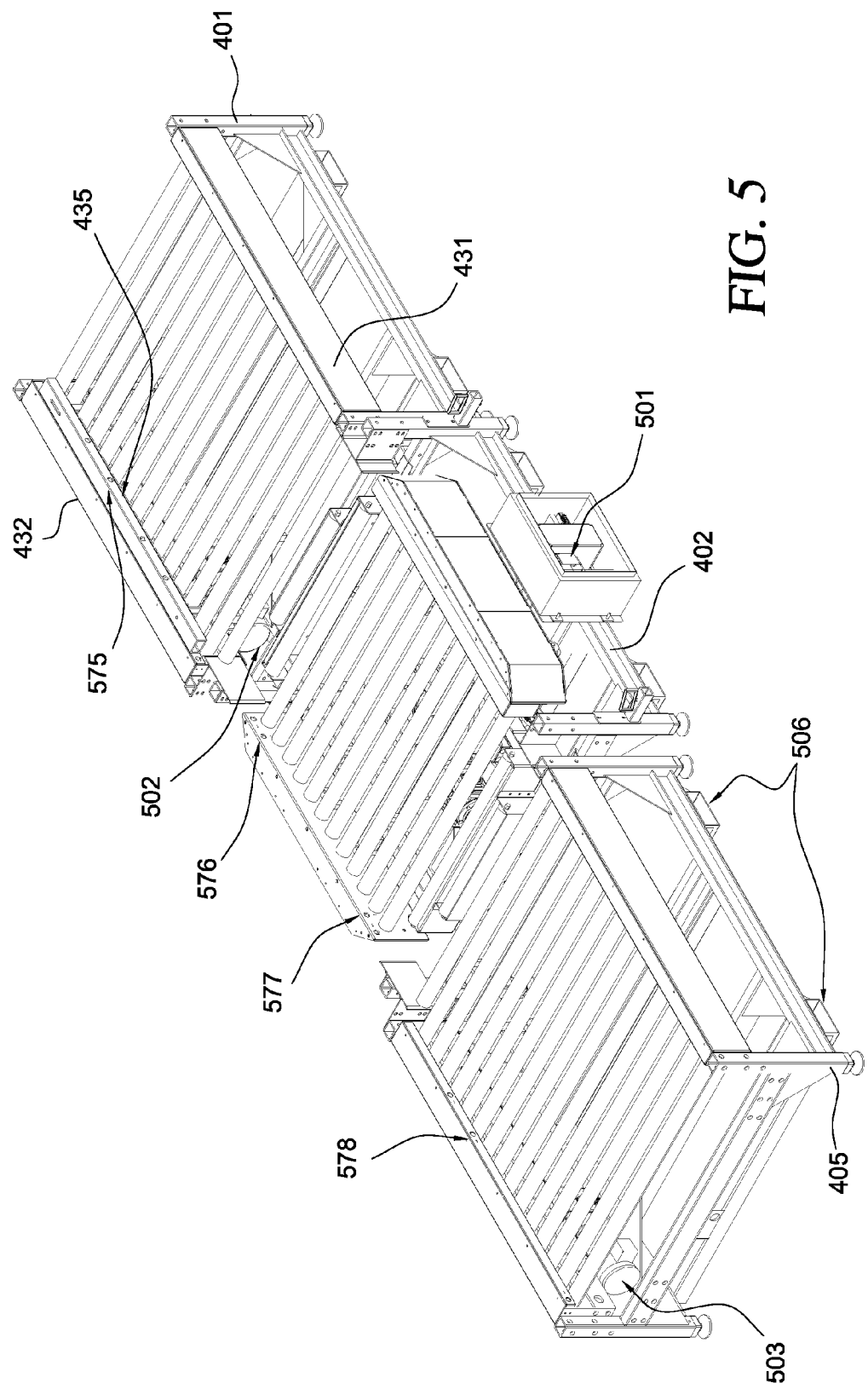
FIG. 5 is a diagram illustrating a portion of the PLM system of FIG. 4, according to the first embodiment.

FIG. 2 is a diagram illustrating an exemplary network architecture diagram of system 100, according to the first embodiment. FIG. 3 is a diagram that illustrates an example of system 100, according to the first embodiment in FIG. 2. FIG. 4 is a diagram of an example of PLM system 400 of system 100, according to the first embodiment. FIG. 5 is a diagram illustrating a portion of PLM system 400, according to the first embodiment. System 100 is merely exemplary and is not limited to the embodiments presented herein. System 100 can be employed in many different embodiments or examples not specifically depicted or described herein. In some examples, system 100 can be considered an apparatus configured to label one or more boxes located on a pallet.

As shown in FIGS. 2-5, box labeling machine or system 100 can include: (a) a PLM system 400 (FIG. 4); and (b) a computer management system 201 (FIG. 2). PLM system 400 can include: (a) an input buffer 401 (FIG. 4); (b) a carousel 402 (FIG. 4); (c) an output buffer 405 (FIG. 4); (d) a reading mechanism 411 (FIG. 4); (e) one or more sensors 575, 576, 577, and 578 (FIG. 5); (f) a movement device or pallet location adjustment mechanism 435 (FIG. 4) located at input buffer 401 and configured to change the location of the pallet located on input buffer 401; (g) a movement device or pallet location adjustment mechanism 444 (FIG. 4) configured to change the location of the pallet located on carousel 402; (h) a marking mechanism 412 (FIG. 4); and (i) a movement mechanism 413 (FIG. 4).

Computer management system 201 can include: (a) a labeler controller 283 (FIG. 2); (b) machine controllers 501, 502, and 503 (FIG. 5); (c) office management server 250 (FIG. 2); (d) central server 200 (FIG. 2) with database 240 (FIG. 2); and (e) user interface devices 205 (FIG. 2). In some examples, the nodes of computer management system 201 can be coupled over local networks and/or the internet using at least one bridge 211, at least one hub 212, and/or at least one wireless network access point 213. In the same or different examples, the network could also be any other public or private network or a virtual private network and could use wired and/or wireless technologies to communicate between the different nodes of computer management system 201.

Computer management system 201 can be configured to determine one or more markings to apply at one or more predetermined locations to the one or more boxes at least partially based on information read from the pallet label.

Computer management system 201 can also be configured to control pallet location adjustment mechanism 435, pallet location adjustment mechanism 444, reading mechanism 411, marking mechanism 412, and movement mechanism 413. Database 240 can be configured to store information regarding the one or more markings to apply at the one or more predetermined locations of the one or more boxes.

A charging module can be located in central server 200 and/or office management server 250 and be configured to calculate an amount to charge a customer to label the one or more boxes. Computer management system 201 can also contain secure software systems for maintaining a transaction-based business where the customers are charged per mark made by system 100. For example, PLM system 400 can be leased to a customer in need of having boxes on a pallet marked, and PLM system 400 at the customer or leasee's premises can coordinate with office management server 250 at the leasee's premises or central server 200 at a remote location to determine how much to charge a customer/leasee based on the number of marks PLM system 400 completes for the customer/leasee.

System 100 can also use the networks to pass system health information back and forth for autonomous diagnostic capabilities. If the remote system seems to be having a failure as indicated by a system-generated signal, remote technicians could attempt to diagnose the problem. Also, system 100 could be used for passing usage information that is stored and tracked for the remote system so that appropriate preventative maintenance is performed on the remote system.

In certain embodiments, data to be placed on the boxes can be manually or automatically derived from the data stored in database 240. A user terminal 282 or labeler controller 283 can be used to manually provide the data that PLM system 400 uses to mark the boxes. In the same or different examples, software systems can automatically generate the data used to mark the boxes. Additionally, wireless interface devices 281 can be used in conjunction with computer management system 201 to modify the contents of a pallet tag's coordinated data that is being stored locally at office management server 250 or remotely at central server 200. The markings to be made on boxes can be modified for any number of reasons, and thus, the database will need to be updated so that, when system 100 physically marks the pallet, the correct data is obtained. For example, the pallet could have a different number of boxes than were stored in the system's online databases, so changes to the marking procedure can be made.

As shown in FIG. 3, in various embodiments, box marking system 100 can include two or more networks of computer management system 201 and PLM system 400. For example, system 100 can include a first set of computer management system 201 and PLM system 400 at first customer site 341, a second set of computer management system 201 and PLM system 400 at a second customer site 342, and a third set of computer management system 201 and PLM system 400 at a third customer site 343. In some examples, central server 200 with database 240 can be used by the various systems at customer sites 341, 342, and/or 343 to monitor, to provide data to, and/or to at least partially control each of PLM systems 400. That is, each of PLM systems 400 at customer sites 341, 342, and 343 can mark boxes on pallets (or other similar products) under the remote monitoring of a central server 200. Each PLM system 400 can be coupled to central server 200 via a network, such as the Internet, using a high-speed connection. If a network connection to central server 200 does not exist or is interrupted, each of office management servers 250 can be used to monitor, to provide data to, and/or to at least partially control each of PLM systems 400, respectively.

Computer management system 201 can be networked to a central repository (e.g., central server 200 and database 240) to facilitate the automatic rapid deployment of new pallet configurations and other related information to each of system 100 that can be present in system 300. System 300 can accomplish this task through inquiries from system 100 to central server 200 based on the business in which a specific PLM system 400 is involved in a specific environment. In some examples, the inquiries of system 100 can be made on a predetermined time schedule or when the information is requested for an on-demand system. The information can be stored in an enterprise level SQL database to ensure the safety of the data. In other embodiments, system 300 can work with an internal network present at a pallet handling facility that does not require an interface to remote database 240.

In many examples, the information needed to label boxes on a pallet can be transferred to labeler controller 283, which is local to PLM system 400, before marking the boxes. Labeler controller 283 can control the label process in real-time. The label marking process can be a fast process, taking only a few minutes or less per pallet, and delays in communicating the marking information to PLM system 400 could lead to mismarking of the pallet.

As shown in FIGS. 4 and 5, PLM system 400 incorporates a system of roller beds to move the pallet from input buffer 401 to carousel 402 to output buffer 405. In certain configurations, PLM system 400 can incorporate additional input and output buffers to improve overall utilization of PLM system 400.

Input buffer 401 can be configured to hold one or more pallets. In various embodiments, input buffer 401 can be configured to receive the pallet from pallet handling device 190 (FIG. 1) and provide pallet 199 (FIG. 1) to carousel 402. Input buffer 401 can incorporate, for example, at least one roller bed 461 to allow easy movement of the pallet from one end of input buffer 401 to the other end of input buffer 401.

In some examples, one or more sensors 575 can be located at or be part of input buffer 401. Sensors 575 can be configured to determine a first location of a pallet on input buffer 401. Pallet location adjustment mechanism 435 can be coupled to or be part of input buffer 401. Pallet location adjustment mechanism 435 can be configured to move one or more pallets from a first location on input buffer 401 to one or more second locations on input buffer 401. For example, pallet location adjustment mechanism 435 can justify, align, or otherwise move the pallet to a predetermined position (e.g., one side of input buffer 401).

In other embodiments, pallet location adjustment mechanism 435 can be located at or be part of carousel 402. For example, pallet location adjustment mechanism 435 can be located on the carousel immediately in front of marking device 403 or 404.

In some examples, pallet location adjustment mechanism 435 can include a justification push bar to align the pallet(s) on input buffer 401 to one side of input buffer 401. The justification bar can be pneumatically driven by two air cylinders to allow for tolerance in the manufacture of a pallet. Pallet location adjustment mechanism 435 can be located at side 432 of input buffer 401 and push on a pallet at a predetermined pressure for a predetermined amount of time to ensure that the pallet has been justified or aligned to side 431 of input buffer 401. Once the pallet is positioned at side 431, the position of the other sides of the pallet can be derived though the use of sensors 575. In other examples, pallet location adjustment mechanism 435 can be located at another side or other portions of input buffer 401 and move the pallet to different locations on input buffer 401.

After a pallet is placed upon input buffer 401, sensors 575 can communicate to central server 200, labeler controller 283, or another part of computer management system 201 that a pallet is available to be marked. Once the pallet has been justified and if carousel 402 is available, PLM system 400 can automatically move the pallet from input buffer 401 to carousel 402.

Carousel 402 can be configured to support the pallet during the box marking process. Carousel 402 can incorporate, for example, at least one roller bed 462 to allow for easy movement of the pallet.

Sensors 576 and 577 can be located at strategic positions and configured to detect pallets and determine the pallets' orientation. In some examples, sensors 576 and 577 can be placed at predetermined locations on side 474 of carousel 402 and a predetermined distance apart from each other such that they can detect the short and long sides of a pallet (e.g., a 1 meter×1.22 meters pallet) by their placement. That is, in some examples, if the long side of the pallet is substantially parallel to side 474, both sensors 576 and 577 detect the pallet. If the short side of the pallet is substantially parallel to side 474, only one of sensors 576 and 577 detects the pallet.

Pallet location adjustment mechanism 444 can be coupled to or part of carousel 402 and can be configured to move a pallet between one or more different locations on carousel 402. In some examples, pallet location adjustment mechanism 444 can include a mechanism (e.g., a motor) configured to turn one or more rollers of roller bed 462 and cause the pallet to move between sides 471 and 473 of carousel 402. Pallet location adjustment mechanism 444 can also include a mechanism that can rotate the pallet or at least a part of carousel 402 and the pallet.

For example, pallet location adjustment mechanism 444 can be configured such that the pallet can be rotated approximately 360 degrees to allow marking device 403 to mark boxes with external surfaces external to any of the sides of the pallet. In other examples, pallet location adjustment mechanism 444 can be configured only to rotate or move the pallet at approximately 180 degrees. In these examples, marking device 403 can mark surfaces of boxes external to two adjacent sides of the pallet, and marking device 404 can mark surfaces of boxes external to the other two adjacent sides of the pallet. In still other examples, carousel 402 can rotate the pallet at another predetermined amount (e.g., approximately 90 degrees when PLM system 400 has only one of marking devices 403 or 404), or carousel 402 can move the pallet only from side 471 to side 473 of carousel 402 (e.g., when PLM system 400 has four marking devices, one at each side of the pallet) and does not rotate the pallet. In each of these examples, carousel 402 also can be referred to as a box marking region.

In some examples, sensors 576 and 577, in coordination with pallet location adjustment mechanism 444 and using software in machine controller 501, the pallet can be centered on carousel 402 to within a predetermined amount (e.g., 1.25 centimeters). Machine controller 501 can convey that the pallet has been centered to labeler controller 283 or central server 200 to coordinate labeling operations. Machine controller 501 will also coordinate with machine controllers 502 and 503 to facilitate moving the pallet on and off carousel 402.

Output buffer 405 can be configured to receive pallet 199 (FIG. 1) from carousel 402. Output buffer 405 can be configured such that pallet handling device 190 (FIG. 1) can remove pallet 199 from output buffer 405. Similar to input buffer 401 and carousel 402, output buffer 405 can have at least one roller bed 463 configured to move the pallet between the ends of output buffer 405.

Input buffer 401 and output buffer 405 can incorporate low profile sidewall designs to accommodate the ease of loading and unloading of the buffers with a pallet handling device in tight spaces. The clean design can rise a predetermined amount (e.g., 7.6 centimeters) above the top radius of the roller bed to contain the bottom planks of the pallet. A low profile design can help to fit input buffer 401 and/or output buffer 405 in places where the overhead allotment is low. This low profile design can allow system 100 to be used in more locations. The overall height of the roller bed modules (e.g., 0.7 meters) is also minimized to allow the stacking of modules for transport (see, e.g., FIG. 7) while still fitting within standard trucking and shipping containers (i.e., a stacked height of less than a predetermined amount (e.g., 2.3 meters)).

All components of PLM system 400 can be configured in a modular fashion to accommodate many different configuration layouts for maximum versatility. The individual pallet handlers (i.e., input buffer 401, carousel 402, and output buffer 405) employ quick disconnect power and communication fittings to allow this versatility. Each module can be self-contained in that it requires only power (pneumatic and/or electric) and/or Ethernet-type communication in order to interoperate with other system components. This self-containment allows for the rapid assembly of PLM system 400 after it has been transported from one physical marking location to another marking area.

Figure 7:
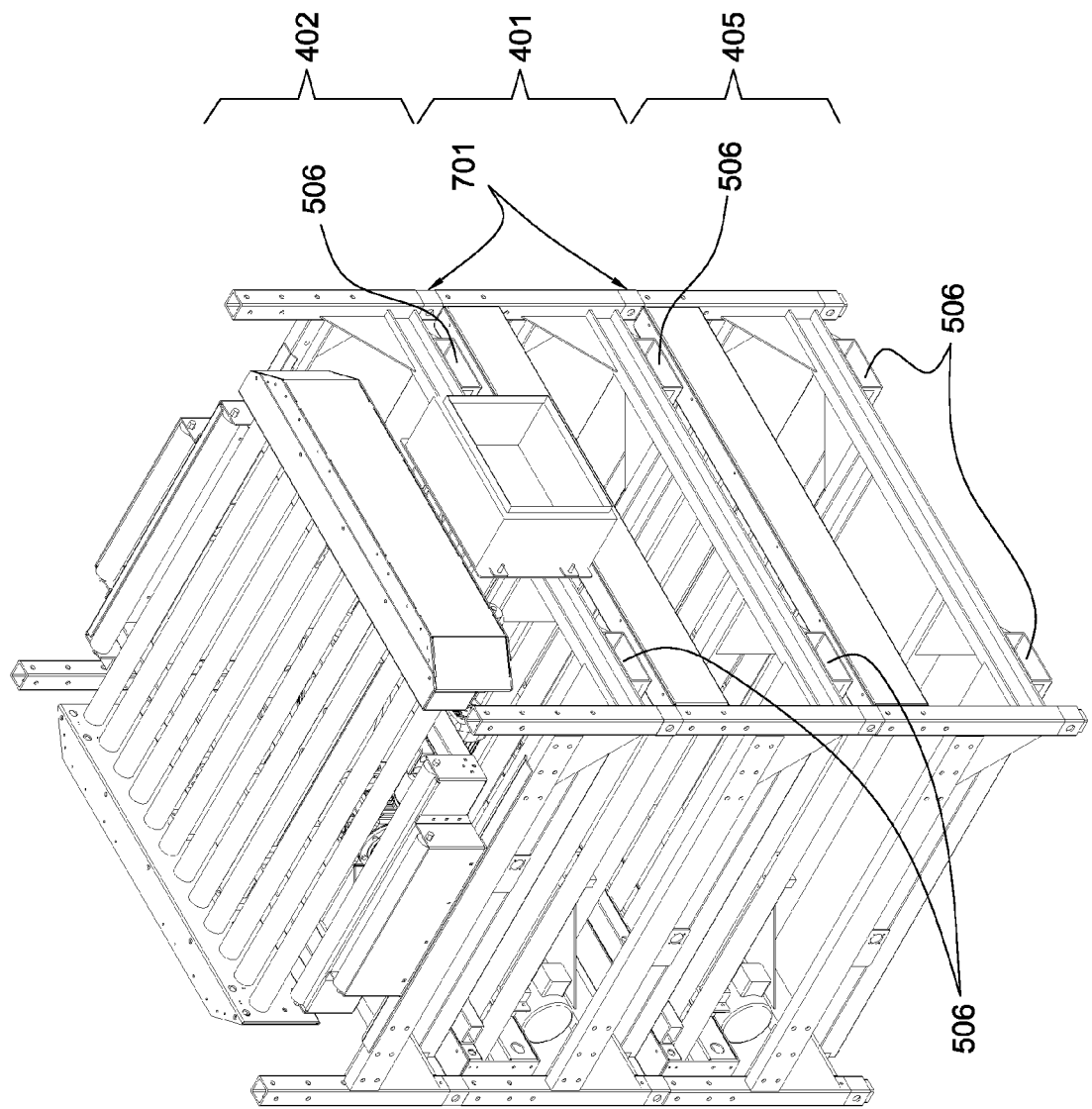
FIG. 7 is a diagram of an example of a part of the PLM system of FIG. 4 in a stack configuration, according to the first embodiment.

In some embodiments, input buffer 401, carousel 402, and/or output buffer 405 are stackable with each other. FIG. 7 shows input buffer 401, carousel 402, and output buffer 405 in a stacked position for transportation purposes. Input buffer 401, carousel 402, and/or output buffer 405 can be lifted from the bottommost set of fork tubes 506 as one piece overall for the maximum space utilization inside the transportation vehicle. To accomplish this maximum space utilization, input buffer 401, carousel 402, and/or output buffer 405 can have the same footprint design and can be stacked through the utilization of special adaptors 701 which interconnect the legs of input buffer 401, carousel 402, and output buffer 405 together securely for transport.

Referring again to FIGS. 4 and 6, PLM system 400 can further include a marking device 403 and a marking device 404. In various examples, marking device 403 can be similar or identical to marking device 404. In the example shown in FIG. 4, two marking devices (i.e., marking devices 403 and 404) are used to allow for faster marking of the boxes on the pallet. In other examples, a single marking device (e.g., either marking device 403 or 404) can be used because PLM system 400 allows all four sides of the pallet to be presented to marking device 403 (or marking device 404) by rotating roller bed 462 of carousel 402 by 360 degrees. Using only a single marking device can reduce the cost of system 100 but can increase the cycle time and throughput for system 100.

Marking device 403 (and/or marking device 404) can include: (a) a reading mechanism 411 configured to read information from the pallet label and configured to help determine the one or more marks to be applied to the boxes by marking mechanism 412; (b) at least one marking mechanism 412 (i.e., a printer mechanism) configured to apply the one or more markings to the one or more boxes at the one or more predetermined locations on the boxes; and (c) a movement mechanism 413 configured to at least partially position marking mechanism 412 (and/or reading mechanism 411) to apply the one or more markings at the one or more predetermined locations.

In some examples, reading mechanism 411 can include a machine vision mechanism or system. In various embodiments, reading mechanism 411 can be a camera. System 100 can compute the labeling data to be burned by marking mechanism 412 by having reading mechanism 411 read information from the pallet tag or receive the information from an external source. System 100 can compare the information read by reading mechanism 411 to the information stored in database 240 (FIG. 2) if computer management central server 200 (FIG. 2) is connected to the internet, or to the information stored in local databases in office management server 250 (FIG. 2) if central server 200 is not available, the comparison information can be used to make a labeling mark. In other examples, central server 200 can use the information on the pallet tag to at least partially determine what information to print on the boxes. In some examples, a device such as a range finder can be used in conjunction with reading mechanism 411 to ensure that marking mechanism 412 is the proper distance from the boxes for marking (e.g., marking mechanism 412 has the proper laser focal distance).

In many embodiments, the boxes include a printed pattern placed on the boxes at the time of box manufacture. In the vicinity of these printed patterns is where marking mechanism 412 marks the boxes. The printed patterns can be identified by reading mechanism 411. In some embodiments, the printed patterns are special and unique so that they are easily identified by reading mechanism 411.

In some embodiments, the area to be marked can be pretreated with a special chemical. For example, a Fujifilm Codestream product or similar product designed specifically to accommodate high speed marking by marking mechanism 412 (e.g., a laser) of barcodes and human readable characters for tracking purposes.

Additionally, reading mechanism 411 can read the preprinted mark area, and system 100 can determine the scale at which reading mechanism 411 will mark the preprinted mark area. In some examples, reading mechanism 411 can measure the size of the preprinted mark area, and, for example, use this measurement to determine that the marking mechanism is at the proper distance from the box to be marked. In various embodiments, central server 200 (FIG. 2) can automatically scale the mark to the size of the target area through the use of software using the measurements of reading mechanism 411 of the size of the preprinted mark area. In the same or different example, a separate sensor, such as a laser range finder, can also be used in conjunction with reading mechanism 411 to ensure the marking device is the proper distance from the boxes to be marked.

Reading mechanism 411 can also be used to trigger marking mechanism 412 to mark an area that reading mechanism 411 identifies as a marking area. Use of reading mechanism 411 to confirm the proper marking area can prevent marking mechanism 412 from trying to create marks in areas where there is no need for a mark, such as spaces where boxes are not present due to partially stacked pallets. Furthermore, this marking area identification also allows system 100 to identify how many boxes were actually marked correctly by marking mechanism 412 and compare it to the number of boxes supposed to be marked in database 240 to identify any inconsistency with the expected number. System 100 can alert system users if any mismatch exists.

Marking mechanism 412 can include least one printer mechanism configured to apply one or more marks to at least one box of the one or more boxes while the pallet is located on carousel 402 or on a conveyor belt. In some examples, PLM system 400 employs a laser with movement mechanism 413 to accomplish marking prearranged boxes and objects in a rapid manner in a predefined area. Marking mechanism 412 can be dynamic marking devices, which means that marking mechanism 412 do not need to be stationary over a marking area to be able to perform their marking operation.

In some embodiments, movement mechanism 413 can include a mechanical stage 415 coupled to marking mechanism 412 and configured to move marking mechanism 412 (and, in some examples, reading mechanism 411). That is, PLM system 400 can place marking mechanism 412 near the predefined parking area through use of servo-mechanical stages that enables marking mechanism 412 to travel along the entire outside surface area of a stacked pallet.

For example, mechanical stage 415 can include three axes 421, 422, and 423. In some examples, each of axes 421, 422, and 423 can be coupled to at least one motor that is configured to move reading mechanism 411 and marking mechanism 412 along such axis. In some examples, one or more servo motors are used to move reading mechanism 411 and marking mechanism 412 in the most rapid method possible.

Axis 423 can be configured to move reading mechanism 411 and marking mechanism 412 substantially perpendicular to the surface to be marked with marking mechanism 412 to adjust the focusing distance. Furthermore, axis 423 can move reading mechanism 411 and marking mechanism 412 out of the physical way as carousel 402 rotates to present different boxes or alternative sides of boxes to marking mechanism 412. Axis 422 can be configured to move reading mechanism 411 and marking mechanism 412 substantially parallel to roller bed 462 to accommodate labeling areas that may be located along that axis. Axis 421 can move reading mechanism 411 and marking mechanism 412 vertically to enable marking mechanism 412 to be able to label areas along the entire height of the stack of boxes.

In the same or different examples, marking mechanism 412 can be coupled to mechanical stage 415 using another servo motor or other device(s) that provide relatively quick, small adjustments of the distance between marking mechanism 412 and the boxes on the pallet. This additional servo motor or other device(s) allow the focal distance between the marking mechanism 412 and specific boxes on the pallet to be adjusted to account for misaligned boxes on the pallet or other problems that cause marking mechanism 412 to not be properly focused. In some examples, reading mechanism 411 can determine the distance between marking mechanism 412 and the next box on the pallet to be marked and the additional servo motor or other device(s) can perform small, quick adjustments to the distance to ensure marking mechanism 412 is properly focused.

In some examples, the focusing distance for marking mechanism 412 is determined by system 100, and mechanical stage 415 moves marking mechanism 412 to a predefined position. That is, reading mechanism 411 can read the printed pattern on the box or can use system 100 to determine the distance between marking mechanism 412 and the boxes. System 100 can instruct mechanical stage 415 to perform the necessary corrections to make sure marking mechanism 412 is at the proper marking focusing distance through use of reading mechanism 411 or other range finding sensors.

Once the pallet is located on carousel 402, the pallet's position is adjusted so that marking device 403 can read a pallet tag on the pallet. In some examples, system 100 can use a machine vision system to determine the labeling requirements of the pallet. Once the label requirements are determined, carousel 402 can position the pallet so that marking device 403 can mark the boxes on the pallet.

Pallet location adjustment mechanism 444, in combination with sensors 576 and 577 (FIG. 5), can move the pallet to predetermined configurations to optimize the ability of marking mechanism 412 to mark the boxes. For example, the pallet can be moved back and forth along roller bed 462 of carousel 402. Mechanical stage 415 can move reading mechanism 411 and marking mechanism 412 to predefined laser marking areas that were printed on the boxes at, for example, the time of box manufacture. System 100 stores informational patterns in its memory (e.g., database 240 (FIG. 2)) that allows it to move quickly to these areas that will be in predefined area when stacked on the pallet correctly. In some examples, the information patterns are at least partially determined reading the pallet tag using reading mechanism 411.

The boxes can be arranged on the pallets according to industry standard configurations established to optimize storage and placement on the pallets. However, sometimes the boxes have manufacturing defects, and/or the boxes are not stacked in the conventional manner. System 100 can recognize the errors and is able to make adjustments to the marking protocols to account for these errors. System 100 uses software and reading mechanism 411 to identify these areas to be marked and to adjust the marking points while reading mechanism 411 and marking mechanism move over the surface of the boxes. In some examples, system 100 can move marking mechanism 412 so that the marks are made at a point offset by an amount determined by reading mechanism 411 from the original marking point either by mechanically moving marking mechanism 412 or by offsetting the origin point of the label to be printed in the print area of marking mechanism 412 through software.

Box label system 100 can be configured to label the boxes when marking mechanism 412 is static or moving. In many embodiments, to mark the boxes in a precise location, box-labeling system 100 is configured to correct for computational and communication delays when determining when to mark the boxes. For example, labeler controller 283 (FIG. 2) can be located some distance from PLM system 400, and transferring information from labeler controller 283 to reading mechanism 411, pallet location adjustment mechanism 444, and/or marking mechanism 412 can take a first predetermined time. Furthermore, processing information in labeler controller 283, reading mechanism 411, pallet location adjustment mechanism 444, and/or marking mechanism 412 can take a second predetermined time. Box label system 100 can be configured to correct for the first and second predetermined time delays and any other delays when marking the boxes.

In some examples, the correction depends on the direction of the movement of the marking mechanism (and/or the pallet). If a row of boxes on the pallet are being mark from bottom to top (i.e., an upward direction), labeler controller 283 (FIG. 2) (or central server 200 (FIG. 2)) can calculate an offset amount based at least in part on the speed of the dynamic movement of marking mechanism 412 and the computational and communication time delays (i.e., the first and second predetermined time delays). If, for example, mechanical stage 415 moves marking mechanism 412 upward at approximately 7-10 cm per second, an offset of approximately 1.25 centimeters can be used. That is, mechanical stage 415 can offset the starting point of upward movement of marking mechanism 412 by approximately 1.25 centimeters. In other embodiments, labeler controller 283 can trigger marking mechanism 412 to start marking at approximately 1.25 centimeters below the predetermined marking region.

Similarly, if a row of boxes on the pallet are being marked from top to bottom (i.e., a downward direction), labeler controller 283 (FIG. 2) (or central server 200 (FIG. 2)) can calculate an offset amount based at least in part on the speed of the movement of marking mechanism 412 and the computational and communication time delays. In this case, mechanical stage 415 can offset the starting point of downward movement of marking mechanism 412 by approximately 1.25 centimeters if mechanical stage 415 moves marking mechanism 412 downward at approximately 7-10 centimeters per second. In other embodiments, labeler controller 283 can trigger marking mechanism 412 to start marking at approximately 1.25 centimeters above the predetermined marking region if mechanical stage 415 moves marking mechanism 412 downward at approximately 7-10 centimeters per second.

In many examples, when marking a row of boxes in a downward direction, the bottom-most box on the row is marked after mechanical stage 415 has stopped moving marking mechanism 412. The movement of marking mechanism 412 is stopped at the bottom-most box because, for example, if the marking mechanism 412 kept moving downward below the box at the bottom of the row, marking mechanism 412 might crash into the pallet or carousel 402. Accordingly, the marking of the bottom-most box when marking a row of boxes from top to bottom can be a static marking process where no dynamic marking offset is used.

In other examples, the marking of a top-most box on a row of boxes when marking from bottom to top can also be a static marking if marking mechanism 412 (or another part of PLM system 400) would crash into another object if the movement in the upward direction continued. In yet other examples, boxes can be marked in a horizontal direction instead of a vertical direction.

After the marking operations are complete, carousel 402 can position itself to be able to pass the pallet to output buffer 405, at which point a pallet handling device such as a pallet handling device can remove the pallet from PLM system 400. Input buffer 401 and output buffer 405 exist to be able to optimize the usage of carousel 402 by making pallets available to be marked whenever carousel 402 finishes marking a pallet regardless of the availability of the pallet handling devices such as forklifts. Pallet(s) with marked boxes can be immediately moved out of the way, and pallet(s) with unmarked boxes can be immediately moved into position to commence marking. In this embodiment, a pallet with unmarked boxes can be placed and aligned on input buffer 401 while another pallet's boxes on carousel 402 are being marked and at least one third pallet is located on one or more output buffer 405, awaiting removal from PLM system 400.

Figure 8:
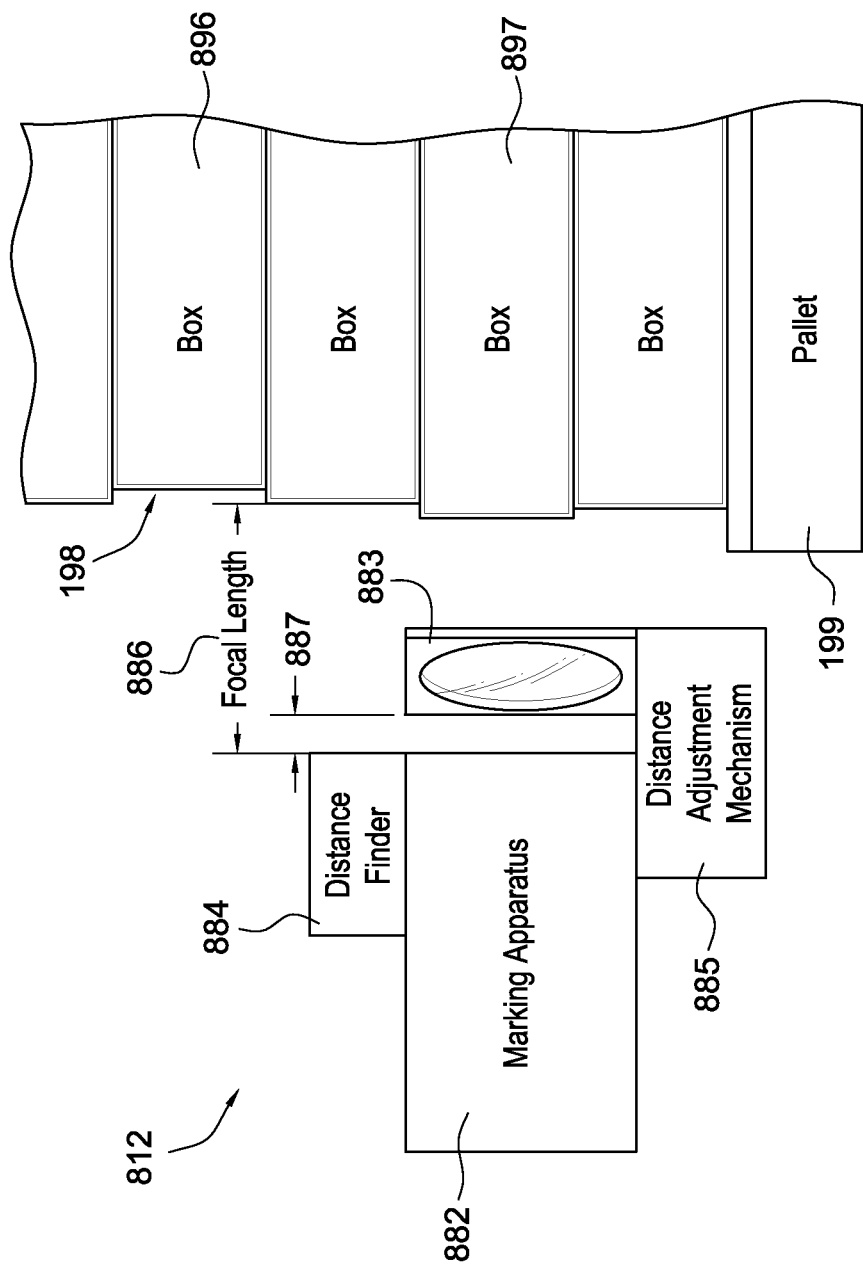
FIG. 8 illustrates a diagram of a marking mechanism, according to a second embodiment.

FIG. 8 illustrates a diagram of a marking mechanism 812, according to a second embodiment. Marking mechanism 812 is merely exemplary and is not limited to the embodiments presented herein. Marking mechanism 812 can be employed in many different embodiments or examples not specifically depicted or described herein. Marking mechanism 812 can be substituted for marking mechanism 412 in some embodiments of box marking system 100.

In some examples, marking mechanism 812 can include: (a) marking apparatus 882; (b) focusing device 883; (c) distance finder 884; and (d) distance adjustment mechanism 885. Focusing device 883 can include a lens configured to focus the light (e.g., the laser light) from marking apparatus 882. Distance adjustment mechanism 885 can be configured to move focusing device 883 relative to marking apparatus 882 (i.e., change distance 887). For example, distance adjustment mechanism 885 can include a servo motor. Distance finder 884 can be configured to determine a focal length 886 between marking apparatus 882 and boxes 198.

In some embodiments, marking mechanism 812 can be configured such that the focal length 886 between marking apparatus 882 and boxes 198 can be adjusted. That is, marking mechanism 812 uses a machine-operated, adjustable focal length lens to account for changing laser focal lengths to the boxes due to boxes being stacked in an offset position. In some situations, the external side of one or more of boxes 198 on pallet 199 can protrude from the stack of boxes (e.g., box 897) or not protrude as far from the center of the stack of boxes as other boxes in the stack of boxes (e.g., box 896). In these situations, the focal length of marking apparatus 882 can be adjusted so as to ensure a clear, readable mark is made on the boxes. In many cases, the mark on the boxes is a bar code, and making the mark using an unfocused laser can create a blurred bar code that is unreadable by bar code readers.

In various examples, distance finder 884 can determine a distance between the next box to be marked and marking apparatus 882. Marking apparatus 882, distance finder 884, central server 200 (FIG. 2), and/or labeler controller 283 (FIG. 2) can determine if the current distance is an acceptable focal length for marking apparatus 882. If the distance is not within the acceptable range of focal lengths, distance adjustment mechanism 885 can adjust distance 887 between marking apparatus 882 and focusing device 883 such that the laser light from marking apparatus 882 will be properly focused at focal length 886.

In many embodiments, moving focusing device 883 relative to marking apparatus 882 is preferable over moving marking apparatus 882 relative to boxes 198 (or moving boxes 198 relative to marking apparatus 882) because focusing device 883 can be moved more rapidly than marking apparatus 882 (or pallet 199) so the time needed to mark boxes 198 can be decreased.

Figure 9:
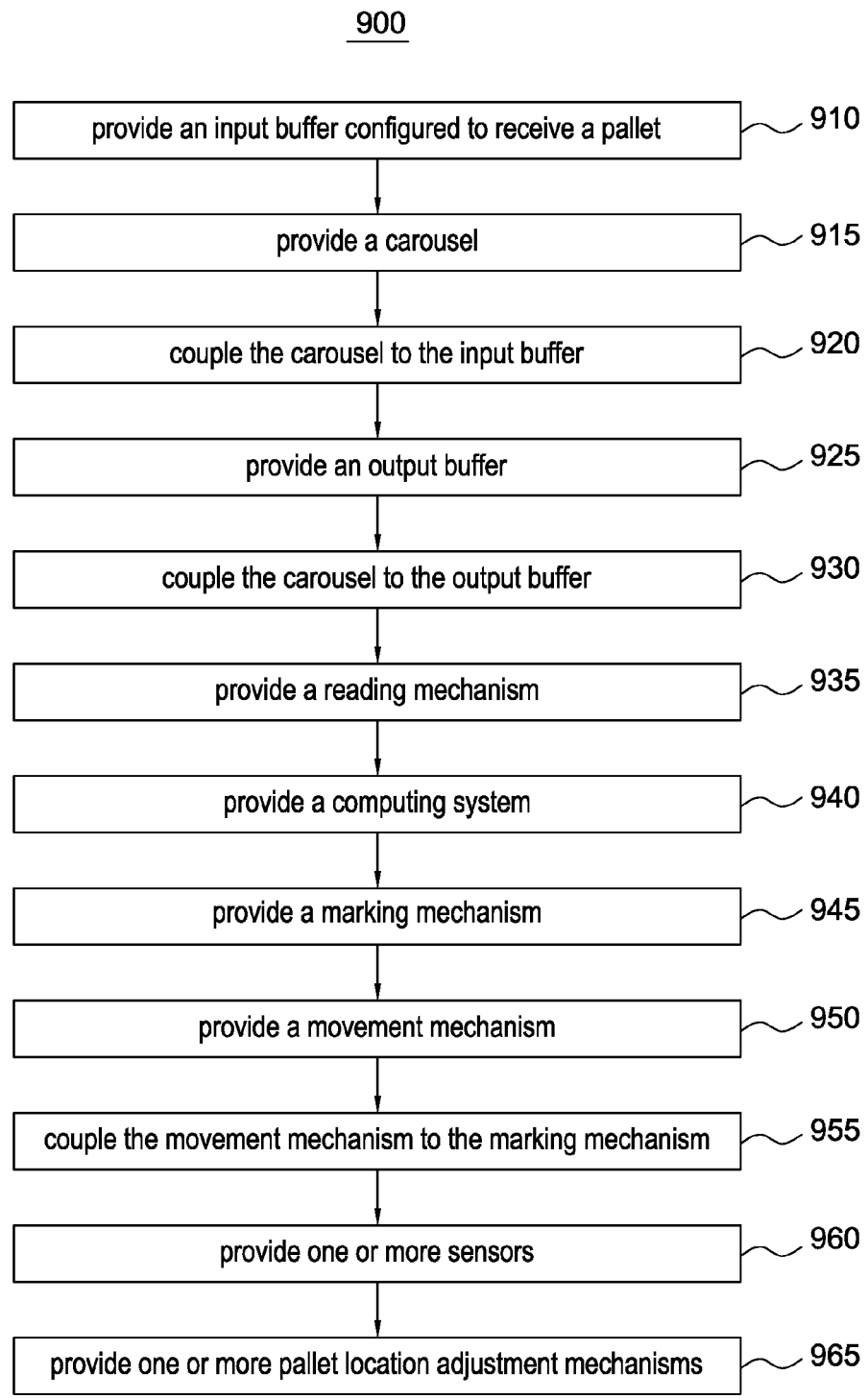
FIG. 9 illustrates a flow chart for an embodiment of a method of providing a box labeling system, according to an embodiment.

FIG. 9 illustrates a flow chart for an embodiment of a method 900 of providing a box-labeling machine, according to an embodiment. Method 900 is merely exemplary and is not limited to the embodiments presented herein. Method 900 can be employed in many different embodiments or examples not specifically depicted or described herein. In some embodiments, the activities, the procedures, and/or the processes of method 900 can be performed in the order presented. In other embodiments, the activities, the procedures, and/or the processes of the method 900 can be performed in any other suitable order. In still other embodiments, one or more of the activities, the procedures, and/or the processes in method 900 can be combined or skipped.

Method 900 of FIG. 9 includes an activity 910 of providing an input buffer configured to receive a pallet. As an example, the input buffer can be similar or identical to input buffer 401 of FIG. 4. In other examples, the box-labeling machine does not include an input buffer and activity 910 and 920 can be skipped.

Method 900 in FIG. 9 continues with an activity 915 of providing a carousel. As an example, the carousel can be similar or identical to carousel 402 of FIG. 4. In other examples, the box-labeling machine does not include a carousel and activity 915 and 920 can be skipped.

Subsequently, method 900 of FIG. 9 includes an activity 920 of coupling the carousel to the input buffer. In some examples, the carousel can be coupled to the input buffer in a manner similar or identical to the coupling of carousel 402 to input buffer 401 as illustrated in FIGS. 4 and 5.

Next, method 900 of FIG. 9 includes an activity 925 of providing an output buffer. As an example, the output buffer can be similar or identical to output buffer 405 of FIG. 4. In other examples, the box-labeling machine does not include an output buffer and activity 925 and 930 can be skipped.

Method 900 in FIG. 9 continues with an activity 930 of coupling the carousel to the output buffer. In some examples, the carousel can be coupled to the output buffer in a manner similar or identical to the coupling of carousel 402 to output buffer 405 as illustrated in FIGS. 4 and 5.

Subsequently, method 900 of FIG. 9 includes an activity 935 of providing a reading mechanism configured to read information from a pallet label. As an example, the reading mechanism can be similar or identical to reading mechanism 411 of FIGS. 4 and 6.

Next, method 900 of FIG. 9 includes an activity 940 of providing a computing system. In some embodiments, the computing system can be configured to determine one or more markings to apply at one or more predetermined locations to one or more boxes. As an example, the computing system can be similar or identical to computer management system 201 of FIG. 2.

Method 900 in FIG. 9 continues with an activity 945 of providing a marking mechanism. In some embodiments, the marking mechanism can be configured to apply the one or more markings to the one or more boxes at the one or more predetermined locations. As an example, the marking mechanism can be similar or identical to marking mechanism 412 of FIGS. 4 and 6 or marking mechanism 812 of FIG. 8.

Subsequently, method 900 of FIG. 9 includes an activity 950 of providing a movement mechanism. In some embodiments, the movement mechanism can be configured to at least partially position the marking device (and, in some examples, the reading mechanism) to apply the one or more markings at the one or more predetermined locations. As an example, the movement mechanism can be similar or identical to movement mechanism 413 of FIGS. 4 and 6.

Figure 6:
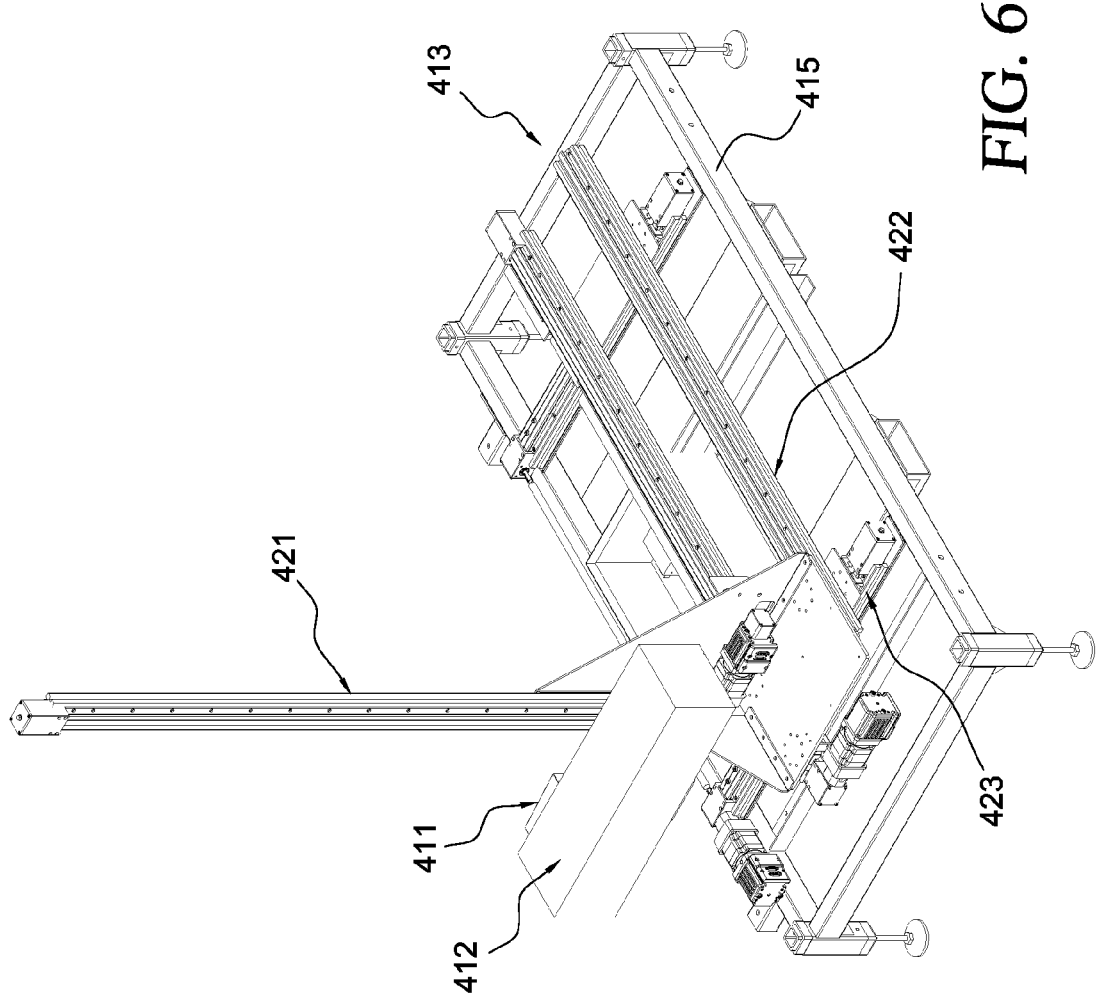
FIG. 6 is a diagram illustrating another portion of the PLM system of FIG. 4, according to the first embodiment.

Next, method 900 of FIG. 9 includes an activity 955 of coupling the movement mechanism to the marking mechanism. The movement mechanism can be coupled to the marking mechanism in a manner similar or identical to the coupling of marking mechanism 412 to movement mechanism 413, as illustrated in FIGS. 4 and 6.

Method 900 in FIG. 9 continues with an activity 960 of providing one or more sensors. In some examples, the one or more sensors can be configured to determine a location of the pallet when the pallet is located on one of the input buffer, the carousel, or the output buffer. As an example, the sensors can be similar or identical to sensors 575, 576, 577, and 578 of FIGS. 4 and 5.

Subsequently, method 900 of FIG. 9 includes an activity 965 of providing one or more pallet location adjustment mechanisms. The one or more pallet location adjustment mechanisms can be configured to change a location of the pallet when the pallet is located on one of the input buffer or the carousel. As an example, the pallet location adjustment mechanisms can be similar or identical to pallet location adjustment mechanisms 435 and 444 of FIG. 4.

Figure 10:
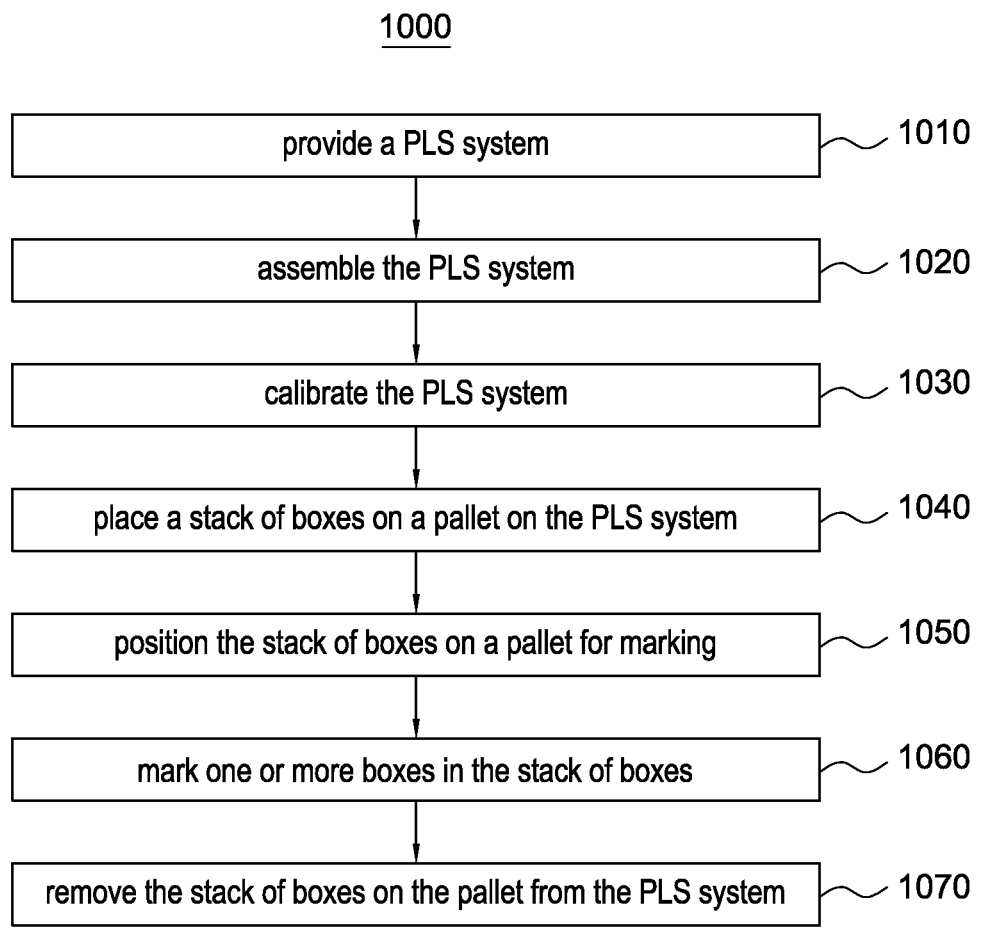
FIG. 10 illustrates a flow chart for a method of labeling one or more boxes located on a pallet, according to an embodiment.

FIG. 10 illustrates a flow chart for an embodiment of a method 1000 of labeling one or more boxes on a pallet, according to an embodiment. Method 1000 is merely exemplary and is not limited to the embodiments presented herein. Method 1000 can be employed in many different embodiments or examples not specifically depicted or described herein. In some embodiments, the activities, the procedures, and/or the processes of method 1000 can be performed in the order presented. In other embodiments, the activities, the procedures, and/or the processes of the method 1000 can be performed in any other suitable order. In still other embodiments, one or more of the activities, the procedures, and/or the processes in method 1000 can be combined or skipped.

Method 1000 of FIG. 10 includes an activity 1010 of providing a PLM system. In some examples, the PLM system can include two or more of: (a) an input buffer; (b) a carousel; (c) an output buffer; (d) at least one reading mechanism; (e) one or more movement devices or pallet location adjustment mechanisms; (g) at least one marking mechanism; and (h) at least one movement mechanism. The carousel of activity 1010 can be referred to as a box marking region. In the same or different embodiment, the PLM system can be similar or identical to PLM system 400 of FIG. 4. In some examples, providing the PLM system involves providing at least part of the PLM system in a stacked or travel configuration, for example, as shown in FIG. 7.

Method 1000 in FIG. 10 continues with an activity 1020 of assembling the PLM system. In some examples, assembling the PLM system can include coupling the input buffer to the carousel and coupling the carousel to the output buffer. Furthermore, the reading mechanism, the pallet location adjustment mechanisms, the marking mechanism, and the movement mechanism can be appropriately coupled to or placed relative to the carousel, the input buffer, and/or the output buffer. In some embodiments, an example of an assembled PLM system is shown in FIG. 4.

Subsequently, method 1000 of FIG. 10 includes an activity 1030 of calibrating the PLM system. Each assembly of the PLM system can create slightly different positions of the elements of the PLM system relative to each other. For example, the assembly of the PLM system can create a slightly different positional relationship between the carousel and the reading and marking mechanisms. Accordingly, the PLM system can require calibration before use in some examples.

Figure 11:
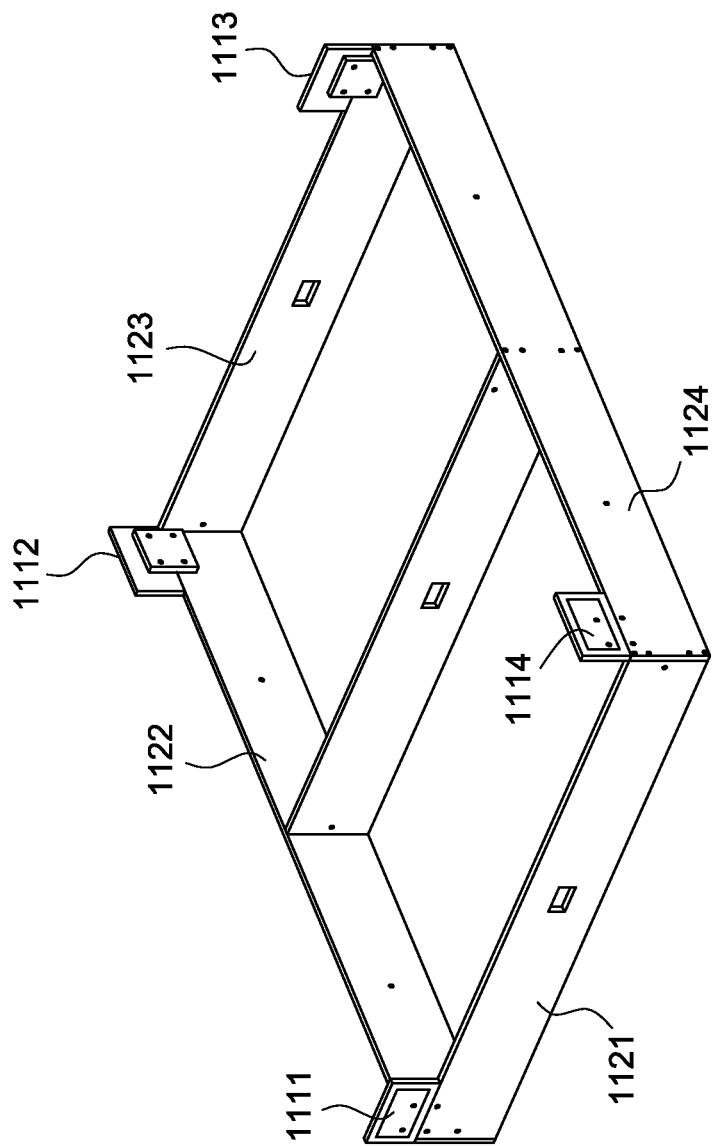
FIG. 11 illustrates an example of a calibration pallet tool, according to an embodiment.

In various embodiments, calibrating the PLM system can be accomplished by using a calibration pallet tool. A calibration pallet tool can be used on different PLM systems to standardize the pallet configurations so that they may be exported between many different same model systems. FIG. 11 illustrates an example of a calibration pallet tool 1100, according to an embodiment. In some examples, calibration pallet tool 1100 can include: (a) sides 1121, 1122, 1123, and/or 1124; and (b) one or more target areas 1111, 1112, 1113, and 1114 on sides 1121, 1122, 1123, and 1124, respectively.

Target areas 1111, 1112, 1113, and 1114 can be used to align each individual side of calibration pallet tool 1100 to the reading and marking device. In one example, calibration pallet tool 1100 can have a size of 1.22 meters by 1.02 meters, and the position of target areas 1111, 1112, 1113, and 1114 can be machined to precision tolerances. The targets can be located in the corner of the pallet for ease of alignment with the "home" position of reading mechanism 411 (FIG. 4). The calibration can bring the marking locations to within, for example, a tolerance of one centimeter offset from the standard position of marking locations.

In some examples, calibration pallet tool 1100 can be placed on PLM system 400 (FIG. 4) and moved to the carousel from the input buffer. Reading mechanism 411 (FIG. 4) can be used to read the locations of the one or more target areas 1111, 1112, 1113, and 1114. System 100 can use the locations of the one or more target areas to calibrate baseline positions to the specific assembled PLM system. The baseline positions are the default positions and measurements used by reading mechanism 411 (FIG. 4), marking mechanism 412 (FIG. 4), etc., when marking boxes on a pallet. The use of default positions and measurements allow use of a standardized set of marking instruction in different PLM systems and different assemblies of a single PLM system.

Next, method 1000 of FIG. 10 includes an activity 1040 of placing a stack of boxes on a pallet on the PLM system. In some examples, a pallet handling device can be used to place a pallet with a stack of boxes on the input buffer of the PLM system.

Method 1000 in FIG. 10 continues with an activity 1050 of positioning the pallet of boxes on the PLM system for marking. In many embodiments, positioning the stack also includes reading the pallet tag to determine information about the boxes to be marked. The PLM system can later use the information to help determine how to mark the boxes.

In some examples, positioning the stack of boxes on the pallet for marking can further include using one or more sensors to determine a first location of a pallet on input buffer. A pallet location adjustment mechanism can move a pallet from a first location on input buffer to one or more second locations on input buffer. For example, a pallet location adjustment mechanism can justify or align the pallet to one side of the input buffer at a predetermined position. Once the pallet is positioned at the side, the position of the other sides of the pallet can be derived though the use of sensors.

After a pallet is placed upon and aligned to input buffer, sensors can communicate to the central server or another part of the computer management system that a pallet is available to be marked. If the carousel is available, the PLM system can automatically move the pallet from the input buffer to the carousel. The pallet location adjustment mechanism, in combination with the sensors, can move the pallet to predetermined configurations to optimize the ability of the marking mechanism to mark the boxes. For example, the pallet can be moved back and forth along the roller bed of the carousel as it is rotated to be able to accomplish this task.

Subsequently, method 1000 of FIG. 10 includes an activity 1060 of marking one or more boxes in the stack of boxes. A mechanical stage can move the reading mechanism and the marking mechanism to predefined laser marking areas on the box where the marking mechanism prints the mark on the boxes. In some examples, the PLM system can mark each box in the stack by moving up and down the rows of boxes on the stack until each side of the boxes exterior to the stack (or a subset therein) are marked. In some examples, marking the one or more boxes can include, adjusting the pallet's position so that the marking device can read a pallet tag on the pallet. Additionally, the pallet location adjustment mechanism can move the pallet as necessary to allow marking of all the boxes on the pallet.

Next, method 1000 of FIG. 10 includes an activity 1070 of removing the stack of boxes on the pallet from the PLM system. After the marking operations are complete, the carousel passes the pallet to the output buffer, at which point a pallet handling device such as a forklift can remove the pallet from the output buffer.

Figure 12:
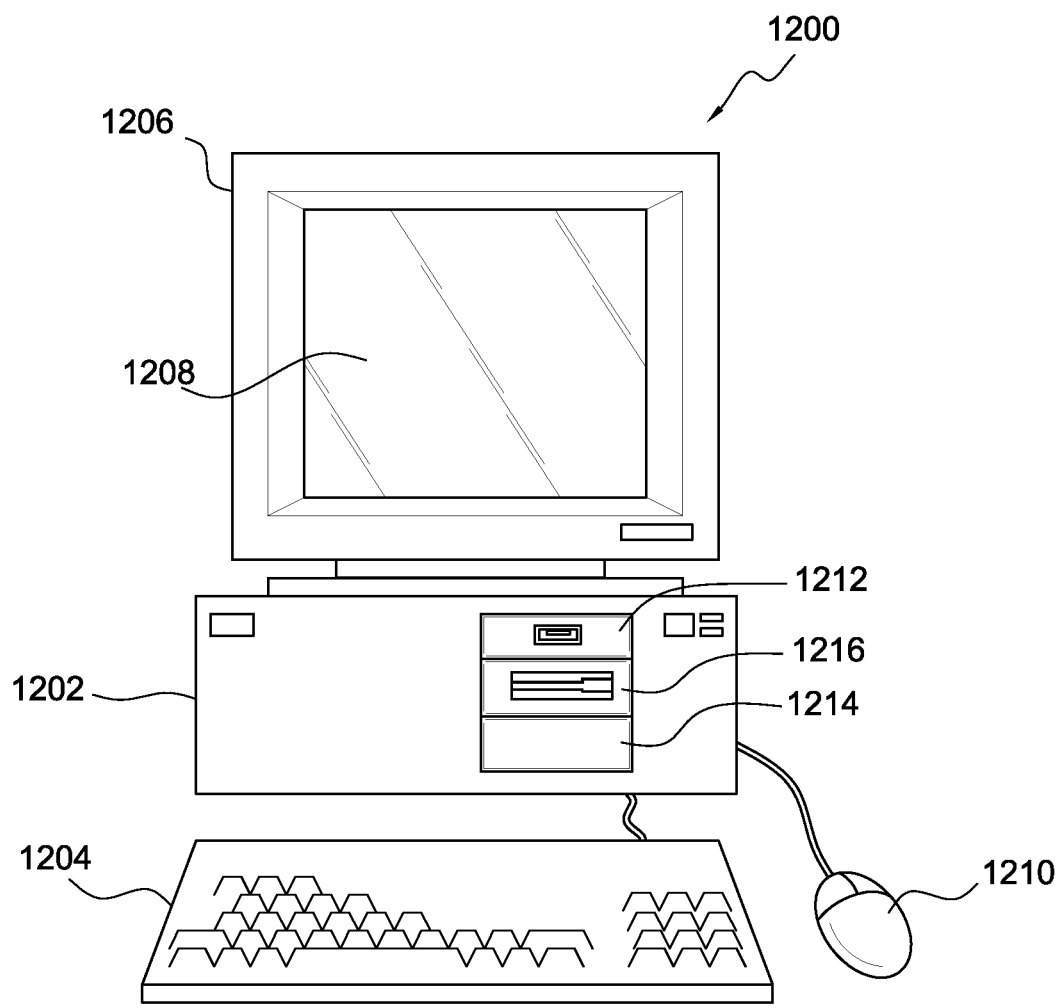
FIG. 12 illustrates a computer that is suitable for implementing an embodiment of the computer system of FIG. 2.
Figure 13:
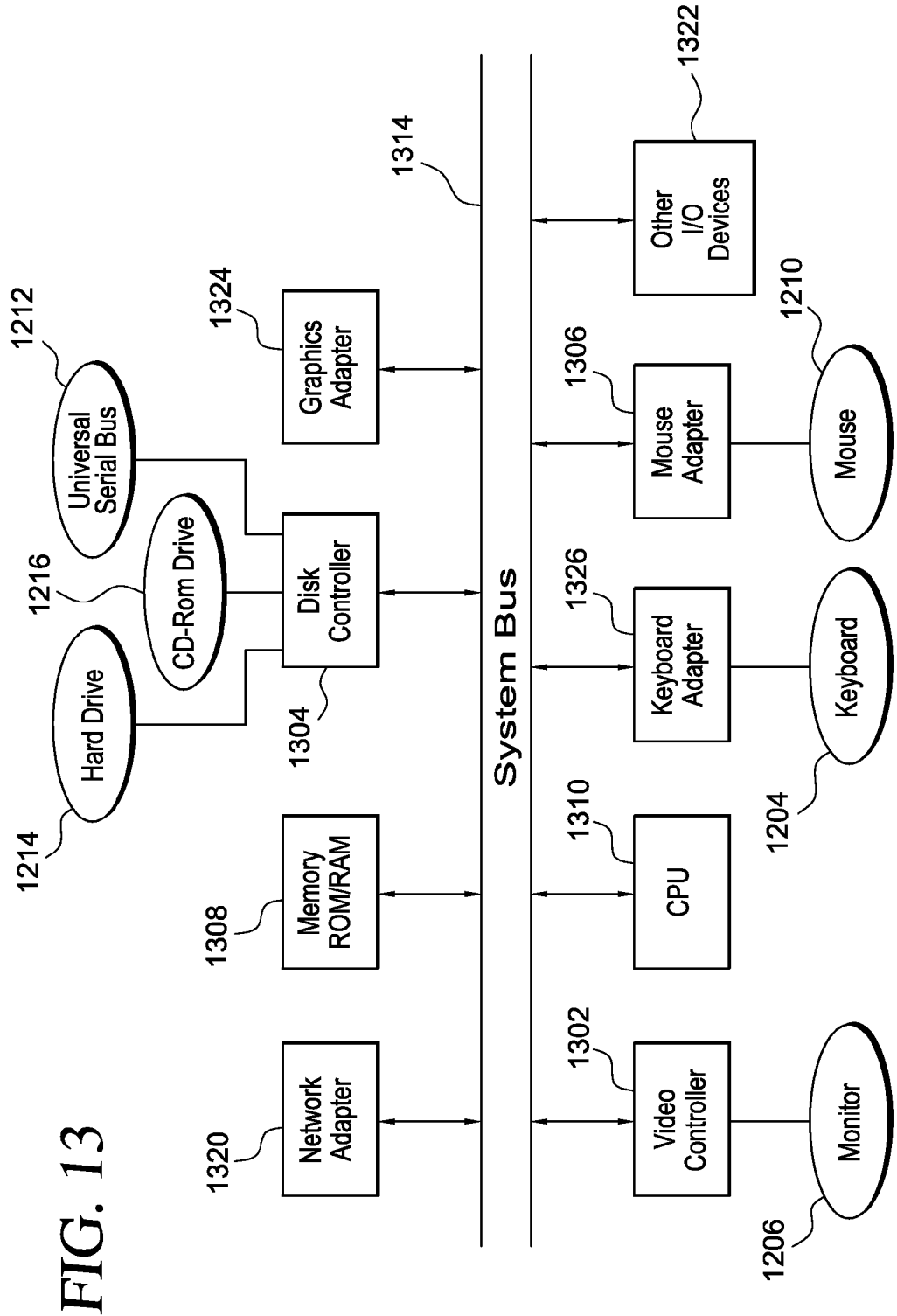
FIG. 13 illustrates a representative block diagram of an example of the elements included in the circuit boards inside chassis of the computer of FIG. 12.

FIG. 12 illustrates a computer 1200 that is suitable for implementing an embodiment of at least a portion of at least one of labeler controller 283, office management server 250, central server 200, or user interface devices 205. Computer 1200 includes a chassis 1202 containing one or more circuit boards (not shown), a USB (universal serial bus) port 1212, a Compact Disc Read-Only Memory (CD-ROM) and/or Digital Video Disc (DVD) drive 1216, and a hard drive 1214. A representative block diagram of the elements included on the circuit boards inside chassis 1202 is shown in FIG. 13. A central processing unit (CPU) 1310 in FIG. 13 is coupled to a system bus 1314 in FIG. 13. In various embodiments, the architecture of CPU 1310 can be compliant with any of a variety of commercially distributed architecture families.

System bus 1314 also is coupled to memory 1308 that includes both read only memory (ROM) and random access memory (RAM). Non-volatile portions of memory 1308 or the ROM can be encoded with a boot code sequence suitable for restoring computer 1200 (FIG. 12) to a functional state after a system reset. In addition, memory 1308 can include microcode such as a Basic Input-Output System (BIOS). In some examples, memory 1308 and/or hard drive 1214 can store database 240 (FIG. 2).

In the depicted embodiment of FIG. 13, various I/O devices such as a disk controller 1304, a graphics adapter 1324, a video controller 1302, a keyboard adapter 1326, a mouse adapter 1306, a network adapter 1320, and other I/O devices 1322 can be coupled to system bus 1314. Keyboard adapter 1326 and mouse adapter 1306 are coupled to a keyboard 1204 (FIGS. 12 and 13), and a mouse 1210 (FIGS. 12 and 13), respectively, of computer 1200 (FIG. 12). While graphics adapter 1324 and video controller 1302 are indicated as distinct units in FIG. 13, video controller 1302 can be integrated into graphics adapter 1324, or vice versa, in other embodiments. Video controller 1302 is suitable for refreshing a monitor 1206 (FIGS. 12 and 13) to display images on a screen 1208 (FIG. 12) of computer 1200 (FIG. 12). Disk controller 1304 can control hard drive 1214 (FIGS. 12 and 13), USB port 1212 (FIGS. 12 and 13), and CD-ROM or DVD drive 1216 (FIGS. 12 and 13). In other embodiments, distinct units can be used to control each of these devices separately.

Although many other components of computer 1200 (FIG. 12) are not shown, such components and their interconnection are well known to those of ordinary skill in the art. Accordingly, further details concerning the construction and composition of computer 1200 and the circuit boards inside chassis 1202 (FIG. 12) need not be discussed herein.

When computer 1200 in FIG. 12 is running, program instructions stored on a USB device in USB port 1212, on a CD-ROM or DVD in CD-ROM and/or DVD drive 1216, on hard drive 1214, or in memory 1308 (FIG. 13) are executed by CPU 1310 (FIG. 13). A portion of the program instructions, stored on these devices, can be suitable for carrying out at least a portion of method 900 (FIG. 9) or method 1000 (FIG. 10) as described previously with respect to FIGS. 1-10.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the activities of methods 900 (FIG. 9) and 1000 (FIG. 10) may be comprised of many different activities, procedures and be performed by many different modules, in many different orders and that the foregoing discussion of certain of these embodiments does not necessarily represent a complete description of all possible embodiments. In other examples, central server 200 (FIG. 2) can include a cluster or collection of computers. For example, in some embodiments, system 100 does not include an input buffer, a carousel, and an output buffer. Instead, the marking devices and other remaining components of system 100 can be placed along a conveyer line to mark the boxes on the pallet as the pallet moves down the conveyer line.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. An apparatus configured to label one or more boxes supported by a pallet, the pallet having a pallet label, the pallet has four sides, at least one surface of each box of the one or more boxes is accessible from at least one of the four sides of the pallet, the apparatus comprising:
    a reading mechanism configured to read first information from the pallet label;
    a computing system configured to determine one or more markings to apply at one or more predetermined locations of the one or more boxes at least partially based on the first information;

a marking mechanism configured to apply the one or more markings at the one or more predetermined locations of each of the one or more boxes; and a first movement mechanism configured to at least partially position the marking mechanism to apply the one or more markings at the one or more predetermined locations, the first movement mechanism comprises:

a mechanical stage coupled to the marking mechanism and configured to move the marking mechanism along three substantially perpendicular axes such that the marking mechanism applies at least one mark of the one or more markings to each of the at least one surface of each box of the one or more boxes of the pallet at the one or more predetermined locations, wherein:

a first one of the one or more predetermined locations are accessible at a first side of the four sides of the pallet;

a second one of the one or more predetermined locations are accessible at a second side of the four sides of the pallet;

a third one of the one or more predetermined locations are accessible at a third side of the four sides of the pallet;

a fourth one of the one or more predetermined locations are accessible at a fourth side of the four sides of the pallet;

the marking mechanism is configured to mark each of the one or more boxes at the one or more predetermined locations without removing the one or more boxes from the pallet;

each of the one or more boxes comprises a preprinted marking area;

the reading mechanism is further configured to read the preprinted marking area to identify the preprinted marking area on each of the one or more boxes and to trigger the marking mechanism to apply the one or more markings to the preprinted marking area on each of the one or more boxes;

the reading mechanism is further configured to instruct the marking mechanism not to apply the one or more markings if the preprinted marking area of one of the one or more boxes is not identified; and the one or more predetermined locations comprise the preprinted marking area of each of the one or more boxes.

2. The apparatus of claim 1, further comprising:
a carousel configured to support the pallet while the pallet supports the one or more boxes; and
a second movement mechanism configured to adjust a location of the pallet with the one or more boxes when the pallet with the one or more boxes is supported by the carousel.

3. The apparatus of claim 2, further comprising:
one or more first sensors configured to determine the location of the pallet with the one or more boxes over the carousel.

4. The apparatus of claim 1, wherein:
the reading mechanism comprises:
a machine vision system.

5. The apparatus of claim 1, wherein:
the marking mechanism comprises:
at least one laser printer.

6. The apparatus of claim 1, further comprising:
a charging module configured to calculate an amount to charge a customer to label the one or more boxes.

7. The apparatus of claim 1, further comprising:
a database coupled to the computing system and configured to store second information regarding the one or more markings to apply at the one or more predetermined locations of the one or more boxes.

8. The apparatus of claim 1, further comprising:
a carousel configured to support the pallet while the pallet supports the one or more boxes;
one or more sensors configured to determine a location of the pallet with the one or more boxes over the carousel; and
a second movement device configured to change the location of the pallet with the one or more boxes over the carousel.

9. The apparatus of claim 8, further comprising:
an input buffer configured to receive the pallet with the one or more boxes from a pallet handling device and provide the pallet with the one or more boxes to the carousel;
one or more additional sensors configured to determine a location of the pallet with the one or more boxes over the input buffer; and
a third movement device configured to change the location of the pallet with the one or more boxes over the input buffer.

10. The apparatus of claim 8, further comprising:
an output buffer configured to receive the pallet with the one or more boxes from the carousel and configured such that a pallet handling device can remove the pallet with the one or more boxes from the output buffer.

11. The apparatus of claim 1, wherein:
the marking mechanism comprises:
a marking device configured to apply a light to the one or more boxes at the one or more predetermined locations to create the one or more markings;
a focusing device configured to focus the light from the marking device before the light creates the one or more markings;
a distance finder configured to determine a first distance between the marking device and a first box of the one or more boxes; and
a distance adjustment mechanism configured to adjust a second distance between the marking device and the focusing device based on the first distance.

12. The apparatus of any of claim 1, wherein:
the one or more boxes contain at least one of fruits or vegetables.

13. A box labeling machine for marking a pallet of boxes, each box on the pallet of boxes comprises a preprinted marking area, the box labeling machine comprising:
an input buffer configured to hold the pallet of boxes;
one or more first sensors configured to determine a first location of the pallet of boxes over the input buffer;
a first pallet location adjustment mechanism coupled to the input buffer and configured to move the pallet of boxes from the first location over the input buffer to one or more second locations over the input buffer;
a carousel coupled to the input buffer such that the pallet of boxes can be moved from the input buffer to the carousel;
one or more second sensors configured to determine a third location of the pallet of boxes over the carousel;
a second pallet location adjustment mechanism coupled to the carousel and configured to move the pallet of boxes from the third location over the carousel to one or more fourth locations over the carousel;
at least one printer mechanism configured to apply one or more markings to at least one box of the pallet of boxes while the pallet of boxes is located over the carousel;
a machine vision mechanism configured to determine a position of the at least one printer mechanism relative to the pallet of boxes;

an output buffer configured to hold the pallet of boxes and coupled to the carousel such that the pallet of boxes can be moved from the carousel to the output buffer; and a reading mechanism configured to identify the preprinted marking area on each box on the pallet of boxes and to trigger the at least one printer mechanism to apply the one or more markings to the preprinted marking area on each box on the pallet of boxes, wherein:

the pallet of boxes has four sides;

each box on the pallet of boxes is accessible from at least one of the four sides of the pallet of boxes;

the at least one printer mechanism is configured such that the at least one printer mechanism can apply at least one marking of the one or more markings to boxes accessible on at least a first side and a second side of the four sides of the pallet of boxes; and the reading mechanism is further configured to instruct the at least one printer mechanism not to apply the one or more markings if the preprinted marking area of one of the boxes on the pallet of boxes that is not identified.

14. The box labeling machine of claim 13, wherein:
the carousel is configured such that the pallet of boxes can be rotated when the pallet of boxes is located over the carousel.

15. The box labeling machine of claim 13, wherein:
the input buffer, the carousel, and the output buffer are configured to be stackable with each other.

16. The box labeling machine of claim 13, further comprising:
a control system configured to control the first pallet location adjustment mechanism, the second pallet location adjustment mechanism, the at least one printer mechanism, and the machine vision mechanism.

17. The box labeling machine of claim 13, further comprising:
a mechanical stage coupled to the at least one printer mechanism and configured to move the at least one printer mechanism along three substantially perpendicular axes.

18. The box labeling machine of claim 13, further comprising:
a calibration pallet tool configured to calibrate the box labeling machine.

19. The box labeling machine of claim 13, wherein:
the boxes of the pallet of boxes contain produce.

20. A method of providing a box labeling device configured to label one or more boxes supported by a pallet, each of the one or more boxes comprises a preprinted marking area, the pallet having a pallet label, the method comprising:

providing a reading mechanism configured to read first information from at least one of the one or more boxes or the pallet label;

providing a computing system configured to determine one or more markings to apply at one or more predetermined locations of the one or more boxes at least partially based on the first information wherein: at least a first one of the one or more markings is to be applied at a first side of four sides of the pallet; and at least a second one of the one or more markings is to be applied at a second side of the four sides of the pallet;

providing a marking mechanism configured to apply the one or more markings at the one or more predetermined locations of the one or more boxes; and providing a movement mechanism configured to at least partially position the marking mechanism to apply the one or more markings at the one or more predetermined locations without removing the one or more boxes from the pallet, wherein:

the reading mechanism is further configured to identify the preprinted marking area on each of the one or more boxes and to trigger the marking mechanism to apply the one or more markings to the preprinted marking area on each of the one or more boxes;

the reading mechanism is further configured to instruct the marking mechanism not to apply the one or more markings if the preprinted marking area of one of the one or more boxes is not identified; and the one or more predetermined locations comprise the preprinted marking area of each of the one or more boxes.

21. The method of claim 20, further comprising:
providing an input buffer configured to receive the pallet while the pallet supports the one or more boxes;

providing a carousel configured to hold the pallet while the pallet supports the one or more boxes and while the marking mechanism marks the one or more boxes on the pallet;

coupling the carousel to the input buffer;

providing one or more sensors configured to determine a first location of the pallet while the pallet supports the one or more boxes and while the pallet is supported by one of the input buffer or the carousel; and providing one or more pallet location adjustment mechanisms configured to move the pallet while the pallet supports the one or more boxes and while the pallet is supported by one of the input buffer or the carousel.

22. A method of labeling one or more boxes on a pallet of boxes, the pallet of boxes has four sides, each box of the one or more boxes is accessible from at least one of the four sides of the pallet of boxes, the method comprising:

placing the pallet of boxes on an input buffer;

automatically moving the pallet of boxes from the input buffer to a box marking region;

automatically aligning at least one marking mechanism to the pallet of boxes while the box marking region supports the pallet of boxes;

using a reading mechanism to read one or more predetermined locations on each of the one or more boxes to identify a marking area on each of the one or more boxes;

adjusting a location of at least one of the marking areas on one of the one or more boxes based upon information from the reading mechanism;

using the at least one marking mechanism to automatically mark each box on the pallet of boxes at the marking area while the box marking region supports the pallet of boxes, wherein at least a first one of the one or more boxes on the pallet of boxes is accessible at a first side of the four sides of the pallet of boxes and at least a second one of the one or more boxes on the pallet of boxes is accessible at a second side of the four sides of the pallet of boxes; and after using the at least one marking mechanism, automatically moving the pallet of boxes to an output buffer.

23. The method of claim 22, further comprising:
assembling together the input buffer, the box marking region, and the output buffer; and
calibrating at least the at least one marking mechanism.

24. The method of claim 22, further comprising:
removing the pallet of boxes from the output buffer using a first pallet handling device, wherein:

placing the pallet of boxes further comprises:

using a second pallet handling device to place the pallet of boxes on the input buffer.

25. An apparatus configured to label one or more boxes supported by a pallet, the pallet having a pallet label, the pallet has four sides, at least one surface of each box of the one or more boxes is accessible from at least one of the four sides of the pallet, the apparatus comprising:

a reading mechanism configured to read first information from the pallet label;

a computing system configured to determine one or more markings to apply at one or more predetermined locations of the one or more boxes at least partially based on the first information;

a marking mechanism configured to apply the one or more markings at the one or more predetermined locations of each of the one or more boxes; and a first movement mechanism configured to at least partially position the marking mechanism to apply the one or more markings at the one or more predetermined locations, the first movement mechanism comprises:

a mechanical stage coupled to the marking mechanism and configured to move the marking mechanism along three substantially perpendicular axes such that the marking mechanism applies at least one mark of the one or more markings to each of the at least one surface of each box of the one or more boxes of the pallet at the one or more predetermined locations, wherein:

a first one of the one or more predetermined locations are accessible at a first side of the four sides of the pallet;

a second one of the one or more predetermined locations are accessible at a second side of the four sides of the pallet;

a third one of the one or more predetermined locations are accessible at a third side of the four sides of the pallet;

a fourth one of the one or more predetermined locations are accessible at a fourth side of the four sides of the pallet; and the marking mechanism is configured to mark each of the one or more boxes at the one or more predetermined locations without removing the one or more boxes from the pallet;

each of the one or more boxes comprises a preprinted marking area;

the reading mechanism is further configured to read the preprinted marking area to identify the preprinted marking area on each of the one or more boxes and to trigger the marking mechanism to apply the one or more markings to the preprinted marking area on each of the one or more boxes;

the reading mechanism is further configured to instruct the marking mechanism not to apply the one or more markings if the preprinted marking area of one of the one or more boxes is not identified;

the one or more predetermined locations comprise the preprinted marking area of each of the one or more boxes;

the reading mechanism is further configured to read information from at least one of the one or more boxes or a pallet label to identify a marking area on each of the one or more boxes and to communicate information about the one or more predetermined locations to the computing system; and the computing system configured to adjust a location of at least one of the one or more predetermined locations based upon the information from the reading mechanism.

26. The apparatus of claim 25, wherein:

the marking mechanism comprises:

a marking device configured to apply a light to the one or more boxes at the one or more predetermined locations to create the one or more markings;

a focusing device configured to focus the light from the marking device before the light creates the one or more markings;

a distance finder configured to determine a first distance between the marking device and a first box of the one or more boxes; and a distance adjustment mechanism configured to adjust a second distance between the marking device and the focusing device based on the first distance.

* * * * *